United States Patent Office 3,629,109
Patented Dec. 21, 1971

3,629,109
BASIC MAGNESIUM SALTS, PROCESSES, AND LUBRICANTS AND FUELS CONTAINING THE SAME
William C. Gergel, Mayfield Heights, Jack L. Karn, Cleveland Heights, and Laurence E. King, Painesville, Ohio, assignors to The Lubrizol Corporation, Wickliffe, Ohio
No Drawing. Continuation-in-part of application Ser. No. 785,343, Dec. 19, 1968. This application Sept. 17, 1969, Ser. No. 858,875
Int. Cl. C10m 1/40, 3/34
U.S. Cl. 252—33
50 Claims

ABSTRACT OF THE DISCLOSURE

Processes for preparing basic magnesium salts of oil soluble organic acids by contacting an inorganic acidic material with a mixture of the acids, or their alkali or alkaline earth metal salts, magnesium oxide, and water or alcohol-water promoter system. Carbon dioxide is an exemplary acidic material. Lower alkanols, particularly methanol, are useful co-promoters for use with the water. Mixtures of oil-soluble sulfonic acids and oil-soluble carboxylic acids, or their alkali or alkaline earth metal salts, are useful starting materials for preparing basic magnesium salts. With alcohol-water co-promoters, the inorganic acidic material is contacted with the reaction mixture in two stages, first in the presence of both promoters and then in the presence of water only. The products are useful as additives in lubricants and fuels and as intermediates in preparing other useful products.

This is a continuation-in-part application of copending application Ser. No. 785,343 filed Dec. 19, 1968, now abandoned.

This invention relates to basic, oil-soluble magnesium salts of organic acids, processes for preparing such basic salts and to lubricating compositions containing these basic magnesium salts. More particularly, the invention is concerned with basic magnesium salts of organic acids prepared by a process which comprises contacting at least one acidic material with at least one oil-soluble organic acid or suitable derivative thereof and at least one basically reacting magnesium compound in the presence of water or a combination of at least one alcohol and water.

As is well-known, basic magnesium salts of organic acids are known in the art and have been utilized as additives for lubricants and fuels. For example, basic magnesium salts, processes for their preparation, and discussion of their usefulness as additives in lubricants and fuels is found in such prior U.S. Pats. as 2,585,520; 2,739,124; 2,889,279; 2,895,913; 3,149,074; 3,150,089; and 3,235,494. However, as recounted in U.S. Pat. 3,150,089, those skilled in the art have sought improved or alternative methods for preparing basic magnesium salts. Those processes which have been developed for the preparation of basic barium and calcium salts have not been entirely satisfactory when used in the preparation of basic magnesium salts. Furthermore, many of the prior art processes invloved the use of magnesium metal as an intermediate in the preparation of magnesium alkoxides and the use of metallic magnesium has obvious drawbacks.

It has now been determined that basic magnesium salts of organic acids can be readily perpared by contacting certain acidic materials with certain organic acids or salts thereof with "active" magnesium oxide in the presence of water or a water-alcohol promoter system. It has also been found that higher metal ratios can be achieved if the acidic material is contacted with the reaction mixture in two steps; i.e., in the presence of both an alcohol and water, subsequently removing any free alcohol from the mixture, and continuing contacting of the acidic material with the remainder of the reaction mixture in the presence of water as the only promoter. Furthermore, the use of oil-soluble aliphatic carboxylic acids or equivalent derivatives thereof in combination with the other organic acids susceptible to "overbasing" results in an advantageous process and novel products. These processes, the novel basic magnesium salts produced according thereto, and lubricating and fuel compositions containing basic salts produced by these processes are contemplated as being within the scope of the present invention.

In accordance with the foregoing, it is a principal object of this invention to provide novel basic, oil-soluble magnesium salts of organic acids including basic magnesium salts having metal ratios of up to about 30 or even higher. A further major object is to provide new processes for preparing basic, oil-soluble magnesium salts of organic acids. A further principal object of the invention is to provide fuel or lubricating compositions comprising respectively, a major amount of a normally liquid fuel or lubricant base and a minor amount of a basic, oil-soluble magnesium salt of an organic acid prepared according to a process of this invention. An additional object of the invention is to provide a process for preparing basic magnesium salts utilizing water or alcohol combinations as the promoter system. Another object of the invention is to provide basic, carbonated, oil-soluble magnesium salts of a combination of at least one oil-soluble sulfonic acid and at least one oil-soluble aliphatic carboxylic acid through a process comprising carbonating the mixture of said acids in the presence of methanol and water, removing the methanol, and continuing carbonation. Still another object of this invention is to provide lubricant compositions comprising a major amount of a lubricating oil and a minor amount of a basic, oil-soluble magnesium salt prepared according to the present invention. A further object is to provide concentrates containing the novel basic magnesium salts prepared according to the process of the present invention, for example, lubricating oil compositions containing these basic magnesium salts in amounts such that when they are incorporated into larger quantities of lubricating oil to prepare lubricating compositions, the lubricating composition will contain a sufficient quantity of the basic magnesium salts to provide detergency to said composition, alone or with other detergents or dispersants.

These and other objects of this invention are achieved by providing a process for preparing oil-soluble basic magnesium salts comprising intimately contacting an acidic material with a mixture comprising (a) at least one member selected from oil-soluble organic acids and their equivalent derivatives susceptible to overbasing (b) a stoichiometric excess based on the total equivalents of acid in (a) of a basically reacting magnesium compound and (c) water. The novel basic magnesium salts of organic acids contemplated as being within the ambit of the present invention are those which are produced in accordance with this general process while the fuel and lubricating compositions contemplated are those containing such basic magnesium salts.

In a more preferred aspect of the invention, the foregoing objectives are achieved by providing a process for preparing oil-soluble, carbonated, basic magnesium salts comprising carbonating a mixture comprising (a) X equivalents of at least one member selected from oil-soluble organic acids and alkali or alkaline earth metal salts thereof, (b) Y equivalents of at least one oil-soluble aliphatic carboxylic acid alkali or alkaline earth metal salts thereof including magnesium salts, (c) Z equivalents of magnesium oxide wherein the value of $$\frac{Z}{X+Y}$$

is from about 1.1 to about 30 or more but usually up to about 20, (d) at least one lower aliphatic alcohol having up to seven carbon atoms, (e) water and (f) a substantially inert organic liquid medium comprising mineral oil and at least one additional substantially inert organic liquid having a lower boiling point than said mineral oil but higher than water, until the reaction between the carbon dioxide and the mixture substantially ceases, subsequently removing substantially all the free lower aliphatic alcohol, while continuing carbonation until the liquid phase of the carbonated mixture is substantially clear and easily filterable. The ratio of $X:Y$ is generally about 1:1 to about 20:1. The lower alkanols, especially alkanols selected from the class consisting of methanol or mixtures of methanol and at least one additional lower alkanol are preferred for this aspect of the invention. Basic magnesium salts thus produced and lubricating compositions and concentrates containing such salts constitute preferred embodiments of the invention.

As used in the present specification, a "basic salt" is one characterized by the presence of a stoichiometric excess of metal relative to the number of equivalents of oil-soluble organic acid present therein based on the normal stoichiometry of the particular metal and organic acids. For example, a "neutral" or "normal" organic acid salt of magnesium is characterized by an equivalent ratio of magnesium to acid of 1:1, while a basic salt is characterized by a higher ratio, e.g., 1.1:1, 2:1, 5:1, 10:1, 15:1, 20:1, 30:1, etc. The term "metal ratio" is used to designate the ratio of equivalents of metal to acid in a basic salt to the number of equivalents expected to be present in a "normal salt" based on the usual stoichiometry of the metal or metals involved and the organic acid or acids present. Thus, an oil-solution of a basic magnesium salt containing one equivalent of an oil-soluble sulfonic acid, one equivalent of an oil-soluble carboxylic acid, and twenty equivalents of magnesium would have a metal ratio of $20 \div (1+1)$ or 10. Likewise, an oil-solution of a basic salt characterized by the presence of two equivalents of a petrosulfonic acid, one equivalent of isostearic acid, three equivalents of calcium, and fifteen equivalents of magnesium has a metal ratio of $(3+15) \div (2+1)$ or 6.

In the present specification, magnesium is regarded as an alkaline earth metal and as having two equivalents per atomic weight; magnesium oxide (MgO) and magnesium hydroxide, two equivalents per mole; etc. The oil-soluble organic acids are regarded as having one equivalent of acid per acidic hydrogen or acid group. Thus, a monocarboxylic acid or monosulfonic acid or their equivalent derivatives such as esters and ammonium and metal salts have one equivalent per mole of acid; ester, or salt; a disulfonic acid or dicarboxylic acid or equivalent derivative has two equivalents per mole, etc. Basically reacting alkali metal compounds such as sodium hydroxide have one equivalent per mole (more accurately, one equivalent per atomic weight of metal). The basically reacting alkaline earth metal compounds such as the oxides, hydroxides, carbonates, and alkoxides (e.g., calcium oxide, calcium hydroxide, barium oxide, barium hydroxide, strontium hydroxide, calcium carbonate, calcium methoxide, barium isopropoxide, etc.), have two equivalents per mole (i.e., two equivalents per atomic weight of metal).

Metal salts of acids characterized by metal ratios in excess of one have been referred to in the prior art as "basic salts," "complex salts," "superbased salts," "overbased salts," and the like. Herein, the terminology "basic salts" is employed. The processes for making such salts are referred to as "overbasing" processes. The exact nature of basic salts is not understood. It has been suggested by some that they comprise stable dispersions of salts formed by contacting the acidic material with the basically reacting metal compounds. Others regard them as "polymeric salts" formed by the reaction of the acidic material, the acid being overbased, and the basically reacting metal compound (see, for example, German Auslegeschrift 1,243,915). For this reason, the salts are described herein mainly by reference to the processes by which they are produced.

The acidic materials which can be used in the processes of the present invention include inorganic acids, usually acidic gases or liquids, such as $H_3BO_3$, $CO_2$, $H_2S$, $SO_2$, $HCl$, $NO_2$, $PCl_3$, $ClO_2$, $SOCl_2$, $BF_3$, $CS_2$, $COS$, etc. Lower aliphatic carboxylic acids can also be used, e.g., oxalic, acetic, propionic acids, and the like. Formic acid is the preferred carboxylic acid. However, the inorganic acidic gases, particularly, $CO_2$, $SO_2$ and $H_2S$ are particularly preferred. Carbon dioxide is the most preferred inorganic acidic material due to overall considerations of cost, ease of use, availability, and performance of the resulting products.

Organic acids susceptible to overbasing, that is, those which can be converted to basic magnesium salts according to the present invention include those known organic acids which have been used or are presently used in preparing basic alkaline earth metal salts (e.g., those described in U.S. Pats. 3,312,618; 2,695,910; and 2,616,904) and constitute an art-recognized class of acids. These organic acids are generally oil-soluble acids but oil-insoluble organic acids can be used in the present process provided basic magnesium salts prepared therefrom according to the procedures of the present invention are soluble in oils (including fuels, fuel oils) at a concentration at which the basic magnesium salt imparts desirable properties thereto as described herein. Thus in the present specification organic acids can be considered "oil-soluble" if they or their normal or basic metal salts are oil-soluble. The phosphorus acids, carboxylic acids, and sulfur acids, which are oil-soluble per se, particularly the oil-soluble sulfonic acids, are especially useful. Oil-soluble derivatives of these organic acids susceptible to overbasing such as their metal salts (e.g., Group I and Group II normal and basic metal salts) ammonium salts, and esters (particularly esters with lower aliphatic alcohols having up to six carbon atoms such as the lower alkanols), can be utilized in the present processes in lieu of or in combination with the free acids. The alkali metal-salts can, if desired, be converted in situ to the magnesium or other alkaline earth metal salt by conventional double decomposition techniques. When reference is made to the acid, its equivalent derivatives susceptible to overbasing are implicitly included unless it is clear that only the acid is intended. Preferably, an oil-soluble organic acid or its oil-soluble neutral or basic alkali or alkaline earth metal salts, including magnesium salts, or mixtures of these will be employed as the oil-soluble organic acid reactant in the processes of this invention.

The phosphorus-containing acids are characterized by at least one oil-solubilizing group attached directly to phosphorus via a carbon atom, e.g., oil-soluble phosphinic and phosphonic acids including the oil-soluble thiophosphinic and thiophosphonic acids. Preferred phosphorus acids are those prepared by reacting olefins with phosphorus sulfides (e.g., phosphorus pentasulfide). Steam-treated reaction products of phosphorus pentasulfide and polyolefins such as polyisobutylene and polypropylene are particularly useful. Such acids are well-known as shown by U.S. Pats. 2,316,078; 2,316,080; 2,316,091; 2,367,468; 2,375,315; 2,377,955; 2,496,508; 2,507,731; 2,516,119; 2,597,750; 2,647,889; 2,688,612; and 2,915,517 which describe the preparation of metal salts of the acids and the preparation of the acid intermediates.

Suitable carboxylic acids include aliphatic, cycloaliphatic, and aromatic mono and polybasic carboxylic acids such as the naphthetic acids, alkyl- or alkenyl-substituted cyclopentanoic acids, alkyl- or alkenyl-substituted cyclohexanoic acids, alkyl- or alkenyl-substituted aromatic carboxylic acids. The aliphatic acids generally contain at least eight carbon atoms and preferably at least twelve carbon atoms. Generally, if the aliphatic carbon chain is branched, the acids are more oil-soluble for any given carbon atom content. The cycloaliphatic and aliphatic carboxylic acids can be saturated or unsaturated. Specific examples include 2-ethylhexanoic acid, α-linolenic acid, propylene-tetramer-substituted maleic acid, behenic acid, isostearic acid, pelargonic acid, capric acid, palmitoleic acid, linoleic acid, lauric acid, oleic acid, ricinoleic acid, undecylic acid, dioctylcyclopentane carboxylic acid, myristic acid, dilauryldecahydronaphthalene carboxylic acid, stearyl-octahydroindene carboxylic acid, palmitic acid, commercially available mixtures of two or more carboxylic acids such as tall oil acids, rosein acids, and the like.

A preferred group of oil-soluble carboxylic acids useful in preparing the basic magnesium salts of the present invention are the oil-soluble aromatic carboxylic acids. These acids are represented by the general formula:

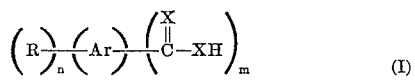

(I)

where R is a hydrocarbon or essentially hydrocarbon radical containing at least four aliphatic carbon atoms, $n$ is an integer of from one to four, Ar is a polyvalent aromatic hydrocarbon radical having a total of up to fourteen carbon atoms in the aromatic nucleus, each X is independently a divalent sulfur or oxygen group, and $m$ is an integer of from one to four with the proviso that R and $n$ are such that there is an average of at least eight aliphatic carbon atoms provided by the R substituents for each acid molecule represented by Formula I. Examples of aromatic radicals represented by the variable Ar are the polyvalent aromatic radicals derived from benzene, naphthalene, anthracene, phenanthrene, indene, fluorene, biphenyl, and the like. Generally, the radical represented by Ar will be a polyvalent radical derived from benzene or naphthalene such as phenylenes and naphthylene, e.g., methylphenylenes, ethoxyphenylenes, nitrophenylenes, isopropylphenylenes, hydroxyphenylenes, mercaptophenylenes, N,N-diethylaminophenylenes, chlorophenylenes, dipropoxynaphthylenes, triethylnaphthylenes, and similar tri-, tetra-, pentavalent radicals thereof, etc.

The R variables are usually hydrocarbon groups, preferably aliphatic hydrocarbon groups such as alkyl or alkenyl radicals. However, the R groups can contain such substituents as phenyl, cycloalkyl (e.g., cyclohexyl, cyclopentyl, etc.) and nonhydrocarbon groups such as nitro, amino, halo (e.g., chloro, bromo, etc.), lower alkoxy, lower alkyl mercapto, oxo substituents (i.e.,=O), thio groups (i.e.,=S), interrupting groups such as —NH—, —O—, —S—, and the like provided the essentially hydrocarbon character of the R variable is retained. The hydrocarbon character is retained for purposes of this invention so long as any non-carbon atoms present in the R variables do not account for more than about 10% of the total weight of the R variables. Examples of R groups include butyl, isobutyl, pentyl, octyl, nonyl, dodecyl, docosyl, tetracontyl, 5-chlorohexyl, 4-ethoxypentyl, 4-hexenyl, 3-cyclohexyloctyl, 4-(p-chlorophenyl)-octyl, 2,3,5-trimethylheptyl, 4-ethyl-5-methyloctyl, and substituents derived from polymerized olefins such as polychloroprenes, polyethylenes, propypropylenes, polyisobutylenes, ethylene-propylene copolymers, chlorinated olefin polymers, oxidized ethylene-propylene copolymers, and the like. Likewise the variable Ar may contain nonhydrocarbon substituents, for example, such diverse substituents as lower alkoxy, lower alkyl mercapto, nitro, halo, alkyl or alkenyl groups of less than four carbon atoms, hydroxy, mercapto, and the like.

A group of more preferred oil-soluble carboxylic acids are those of the formula:

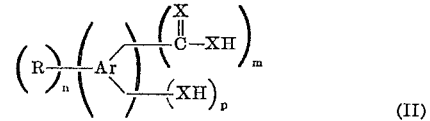

(II)

where R, X, Ar, $m$ and $n$ are as defined in Formula I and $p$ is an integer of 1 to 4, usually 1 or 2. Within this group, an especially preferred class of oil-soluble carboxylic acids are those of the formula:

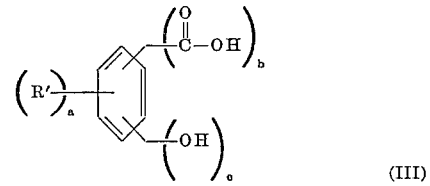

(III)

where R' is an aliphatic hydrocarbon radical containing at least four carbon atoms, $a$ is an integer of from 1 to 3, $b$ is 1 or 2, $c$ is zero, 1, or 2 and preferably 1 with the proviso that R' and $a$ are such that the acid molecules contain at least an average of about twelve aliphatic carbon atoms in the aliphatic hydrocarbon substituents per acid molecule. And within this latter group of oil-soluble carboxylic acids, the aliphatic-hydrocarbon substituted salicylic acids wherein each aliphatic hydrocarbon substituent contains an average of at least about sixteen carbon atoms per substituent and one to three substituents per molecule are particularly useful. Basic magnesium salts prepared from such salicylic acids wherein the aliphatic hydrocarbon substituents are derived from polymerized olefins, particularly polymerized lower 1-monoolefins such as polyethylene, polypropylene, polyisobutylene, ethylenepolypropylene copolymers and the like and having an average molecular weight of about 200 to about 1200, preferably about 300 to about 700, are very useful as lubricant additives.

The oil-soluble carboxylic acids corresponding to Formulae I–III above are well-known or can be prepared according to procedures known in the art. Carboxylic acids of the type illustrated by the above formulae and processes for preparing their metal salts are disclosed in such U.S. Pats. are 2,197,832; 2,197,835; 2,252,662; 2,252,664; and 2,714,092. The salts can be converted to the acid by neutralizing with an inorganic acid such as HCl.

The most preferred oil-soluble organic acids for use in preparing the basic magnesium salts are the oil-soluble sulfonic acids including the synthetic oil-soluble sulfonic acids. Suitable oil-soluble sulfonic acids are represented by the general formulae:

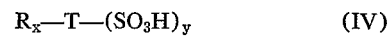
$$R_x—T—(SO_3H)_y \qquad (IV)$$
$$R'—(SO_3H)_r \qquad (V)$$

In Formula IV, T is a cyclic nucleus of the mono- or polynuclear type including benzenoid or heterocyclic neuclei such as a benzene, naphthalene, anthracene, 1,2,3,4-tetrahydronaphthalene, thianthrene, or biphenylnucleus and the like. Ordinarily, however, T will represent an aromatic hydrocarbon nucleus, especially a benzene or naphthalene nucleus. The variable R in the radical $R_x$ includes the same groups as the R variable in Formula I above and can be, for example, an aliphatic group such as alkyl, alkenyl, alkoxy, alkoxyalkyl, carboalkoxyalkyl, an aralkyl group, or other hydrocarbon or essentially hydrocarbon groups, while $x$ is at least one with the proviso that the variables represented by the group $R_x$ are such that the acids are oil-soluble. This means that the groups represented by $R_x$ should contain at least about eight aliphatic carbon atoms per sulfonic acid molecule and preferably at least about twelve aliphatic carbon atoms. Generally $x$ will be an integer of 1–3. The variables $r$ and $y$ have an average value of one to about four per molecule.

The variable R' in Formula V is an aliphatic or aliphatic-substituted cycloaliphatic hydrocarbon or essentially hydrocarbon radical. Where R' is an aliphatic radical, it should contain at least about fifteen to about eighteen carbon atoms and where R' is an aliphatic substituted-cycloaliphatic group, the aliphatic substituents should contain a total of at least about twelve carbon atoms. Examples of R' are alkyl, alkenyl, and alkoxyalkyl radicals and aliphatic-substituted cycloaliphatic radicals wherein the aliphatic substituents are alkoxy, alkoxyalkyl, carboalkoxyalkyl, etc. Generally the cycloaliphatic radical will be a cycloalkane nucleus or a cycloalkene nuceus such as cyclopentane, cyclohexane, cyclohexene, cyclopentene, and the like. Specific examples of R' are cetyl-cyclohexyl, laurylcyclohexyl, cetyl-oxyethyl and octadecenyl radicals, and radicals derived from petroleum, saturated and unsaturated paraffin wax, and polyolefins, including polymerized mono- and diolefins containing from about 1 to 8 carbon atoms per olefin monomer unit. The groups T, R, and R' in Formulae IV and V can also contain other substituents such as hydroxy, mercapto, halogen, nitro, amino, nitroso, carboxy, lower carboalkoxy, etc., as long as the essentially hydrocarbon character of the groups is not destroyed.

Illustrative examples of the sulfonic acids are mahogany sulfonic acids, petrolatum sulfonic acids, mono- and polywax-substituted naphthalene sulfonic acids, cetylchlorobenzene sulfonic acids, cetylphenol sulfonic acids, cetylphenol disulfide sulfonic acids, cetoxycapryl benzene sulfonic acids, dicetyl thianthrene sulfonic acids, di-lauryl beta-naphthol sulfonic acids, dicapryl nitronaphthylene sulfonic acids, paraffin wax sulfonic acids, unsaturated paraffin wax sulfonic acids, hydroxy-substituted paraffin wax sulfonic acids, tetraisobutylene sulfonic acids, tetraamylene sulfonic acids, chloro-substituted paraffin wax, nitrosyl-substituted paraffin wax sulfonic acids, petroleum naphthene sulfonic acids, cetylcyclopentyl sulfonic acids, lauryl cyclohexyl sulfonic acids, mono- and polywax-substituted cyclohexyl sulfonic acids, and the like.

As used herein, the terminology "petroleum sulfonic acids" or "petrosulfonic acids" is intended to cover that well-known class of sulfonic acids derived from petroleum products according to conventional processes such as disclosed in U.S. Pats. 2,480,638; 2,483,800; 2,717,265; 2,726,261; 2,794,829; 2,832,801; 3,225,086; 3,337,613; 3,351,655; and the like. Sulfonic acids falling within Formulae IV and V are discussed in prior U.S. patents as 2,616,904; 2,616,905; 2,723,234; 2,723,235; 2,723,236; 2,777,874; and the other U.S. patents referred to in each of these patents. Thus it is seen that these oil-soluble sulfonic acids are well-known in the art and require no further discussion herein.

Of course, mixtures of the above-described organic acids and derivatives thereof susceptible to overbasing can be employed in the processes of this invention to prepare basic magnesium salts. In fact, as described below, some mixtures of acids constitute preferred embodiments of the invention.

The principal source of magnesium in the processes of the present invention is active magnesium oxide. Magnesium oxide is commercially available in two forms, a so-called "light" or "active" form and a relatively inactive form known as "dead burned" or "heavy" magnesium oxide. Active forms of magnesium oxide are available from various chemical companies under such names as Morton Elastomag 20, Elastomag 100, Elastomag 170; and Dow Synthetic Magnesite, Calcined. The use of magnesium oxide in lieu of magnesium metal as is used in many of the prior art processes not only avoids the problems associated with the storage, handling, and reactions of magnesium metal but offers a tremendous economic advantage. At current prices, based on the magnesium content, magnesium in the form of magnesium oxide costs less than one-fourth the price of magnesium metal.

An important distinction between the present processes and the processes of the prior art is that water alone can be used as an effective promoter. Generally speaking, the prior art has utilized alcohols, aminoalcohols, glycols, phenols, and the like as promoters in overbasing processes. The amount of water to be used in the present processes depends largely upon the amount of magnesium oxide employed. Generally, at least about one-tenth mole of water is used for each mole of magnesium oxide employed. Molar ratios of water to magnesium oxide of up to about 5:1 can be used in the present process although there is a tendency for the resulting product to be hazy when such large amounts of water are utilized. While the reason for this haziness is not completely understood, it is believed that large amounts of water make possible the crystal growth of the magnesium salts produced. Generally, the molar ratio of water to magnesium oxide will be from about 0.5:1.0 to about 3.0:1.0.

As mentioned above, when water alone is used as the promoter, there is a tendency for the product to be hazy. It has been determined that if the water is used in combination with a lower alcohol, this tendency can be greatly reduced or completely eliminated. While lower aliphatic alcohols, that is, alcohols containing up to seven aliphatic carbon atoms can be used effectively, it is preferred that the alcohol promoter have a boiling point less than water i.e., 100° C., for reasons explained more fully hereinafter. Suitable alcohol promoters include methanol, ethanol, n-propanol, isopropanol, n-butanol, isobutanol, n-pentanol, n-hexanol, ethylene glycol, propylene glycol, trimethylene glycol, 2-mercaptoethanol, 2-aminoethanol, 2-methoxyethanol, 2 - propoxyethanol, 2 - butoxyethanol, and the like. The preferred alcohol promoters are the lower alkanols, particularly those containing not more than four carbon atoms such as methanol, ethanol, n-propanol, isopropanol, etc. Mixtures of various alcohols are also suitable alcoholic promoters for use in combination with water. Obviously mixtures of two or more of these preferred lower alkanols are also useful. Methanol is the most preferred alcohol promoter although ethanol and isopropanol are also particularly useful alcoholic promoters for use in combination with the water. Best results seem to be achieved if methanol constitutes at least about 25% by weight of the total weight of any alcohol employed as a co-promoter.

Since the process is operative without the alcoholic promoter, that is, with water alone, it is apparent that there is no critical minimum amount of alcohol from the standpont of operability. Ordinarily, however, in order to achieve the best haze-eliminating or reducing capabilities of the combination of alcohol and water as a promoter system, at least about 0.1 mole of alcohol should be used with each mole of water employed. When the combination of alcohol and water is used as a promoter system, the amount of water utilized remains that discussed hereinabove for water alone. Best results are achieved when the alcohol-water molar ratio is within the range of about 0.5:1 to about 10:1. Normally, the molar ratio of alcohol to water will be about 0.8:1 to about 3:1. Molar ratios of about 1:1 to about 2:1 provide an excellent starting point from which to determine the optimum ratio of alcohol and water for any given combination of acid, alcohol, and water.

The process of the present invention is conducted in the presence of at least one substantially inert organic liquid diluent. This diluent should comprise at least about 10% by weight of the total weight of the reaction mixture prior to contacting the mixture with acidic gas. Ordinarily, the diluent will not exceed 80% by weight of the reaction mixture. Preferably, the diluent will comprise from about 30% to about 70% of the reaction mass. Suitable diluents include mineral oils, Stoddard solvent, aliphatic, cycloaliphatic, and aromatic hydrocarbons and the corresponding halogenated hydrocarbons such as chlorobenzenes, and the other conventional organic diluents generally employed in the overbasing procedures of the prior art. Preferably, the diluent selected will be oil-soluble.

A preferred diluent will comprise mineral oil and at least one other diluent which is soluble in mineral oil but is less viscous than the mineral oil and, therefore, facilitates handling and filtering of the reaction mass. Suitable diluents for use in combination with mineral oil are those of the type mentioned above, that is, aliphatic, cycloaliphatic, and aromatic hydrocarbons and halogenated hydrocarbons. Specific examples include kerosene, xylene, toluene, ethylbenzene, n-propylbenzene, cumene, Stoddard solvent, fluorobenzene, chlorobenzene, bromobenzene, o-fluorotoluene, heptane, octane, nonane, decane, 2,2,4-trimethylpentane, cyclohexane, cycloheptane, cyclooctane, ethylcyclohexane, and the like. For best results, it is desirable that this less viscous diluent comprise about 30% to about 50% by weight of the total weight of starting materials used in the process, particularly in preparing products having metal ratios in excess of five. The less viscous diluents facilitate filtration and for some reason, improve oil-solubility of the final basic magnesium product. That is, the tendency for solids to precipitate during long-term storage is reduced or eliminated. Furthermore, in the absence of these less viscous diluents, there is a tendency in some instances, particularly in preparing products of higher metal ratios (e.g., metal ratios in excess of five) for an unfilterable gel-like mass to form. While such gels can be used as basic magnesium components in greases or as anti-rust, anti-corrosion protective coatings (usually 0.5 to 10 mil thickness) on ferrous metal surfaces exposed to air, moisture, and/or acidic vapors, they are not ordinarily suitable as fuel and lubricating oil additives.

In one aspect of this invention, it is preferred that the less viscous diluent used in combination with mineral oil will have a boiling point higher than 75° C. and preferably higher than 90° C. This is in the processes using an alcohol-water promoter where carbonation is conducted first in the presence of alcohol and water and then in the presence of water. For best results, it has been determined that carbonation in the presence of water alone should be at a temperature of at least about 75° C. and preferably at least about 90° C. Since it is convenient to conduct carbonation at the reflux temperature, diluents having boiling points of at least about 75° C. at standard pressure are preferred. For this reason, xylene is a particularly preferred diluent since it forms an azeotrope with water boiling at 90°–95° C. It offers the additional advantage of assisting in the removal of water upon completion of the process.

In its broadest aspect, the process of this invention involves mixing the components of the reaction mixture, that is, the acids or other suitable derivatives thereof as discussed above, active magnesium oxide, water, and diluent and introducing into this reaction mixture at least one inorganic acidic material. The temperature at which the acidic material is contacted with the remaining components of the reaction mass is not critical. Thus, the minimum temperature is that temperature at which the reaction mixture remains fluid, that is, does not begin to solidify. The maximum temperature is the decomposition temperature of the reaction component or product with the lowest decomposition point. Usually, the temperature will be in the range of about 25°–200° C. and preferably about 50°–150° C. The acidic material is conveniently contacted with the components of the reaction mixture at the reflux temperature. The reflux temperature obviously depends upon that material having the lowest boiling point. Accordingly, where methanol is used as a promoter in combination with water, the reaction mixture will be contacted with the acidic material at the reflux temperature of methanol. If water is the only promoter and the component of the reaction mixture having the lowest boiling point, the reflux temperature will be the boiling point of water or an azeotrope of water with, for example, xylene.

Generally, the acidic material is contacted with the components of the reaction mixture until there is no further reaction between the components of the reaction mixture and the acidic material that is, until reaction between the components of the reaction mixture and the acidic material substantially ceases. This can be determined in a number of ways conventional in the art. For example, if the acidic material is a gas which is being bubbled through the reaction mixture, then this "end point" is reached when the amount of gas being blown into the mixture substantially equals (that is, corresponds to about 90%–100%) the amount of gas leaving the reaction mixture. This is readily determined by the use of metered inlet and outlet valves for the gas. The end point can also be ascertained by periodic measurement of the pH of the reaction mixture. At the point at which the basicity becomes substantially constant, or the reaction mixture begins to become acidic, the "end point' has been reached. While it is preferable that the acidic material be contacted with the reaction mixture until there is no further reaction, useful basic magnesium salts can be prepared when the reaction mixture is contacted with the acidic material for a period of time sufficient for about 70% of the total acidic material to react relative to the amount which would react if the reaction were permitted to proceed to its "end point" as described above.

Upon completion of the reaction between the acidic material and the components of the reaction mixture, the solid components of the reaction product are usually removed by filtration, centrifugation or other convenient means. Thereafter, the reaction product is stripped, generally at reduced pressure, to remove alcohol, water, and, if desired, diluent having a boiling point less than mineral oil. Obviously, the reaction mixture can be stripped prior to removing solids if desired.

The foregoing procedure preferably is modified in the manner explained below if it is desired to prepare a basic magnesium salt having a metal ratio in excess of about 5 or 6. In this modified procedure, alcohol must be used as a co-promoter with the water. The reaction components are mixed together and this reaction mixture is then contacted with the acidic material in two stages. First, the components of the reaction mixture and the acidic material are contacted in the same manner as described above until the reaction between the inorganic acidic material and the reaction mixture substantially ceases. Thereafter, the temperature of the reaction mixture is raised to remove substantially all free alcohol promoter. It is preferable to continue contacting the acidic material with the reaction mixture during this period of time that the alcohol promoter is being removed although this is not essential. Any water that is removed during the removal of the alcohol is preferably replaced at this point. The reaction mixture with substantially all free alcohol removed is then contacted with the more acidic material, usually until the liquid phase of the reaction mass becomes substantially clear. Thereafter, the reaction mass is generally filtered, etc., to remove solids and the water is removed by heating, generally at reduced pressures. Again, if desired, any low boiling diluent can also be removed at this point. As mentioned hereinbefore, this two-stage procedure for contacting the reaction mixture with the acidic material results in products having little or no haze and which are more easily filtered. Moreover, basic magnesium salts having metal ratios in excess of about 5 have improved oil solubility when they are prepared by this two-stage process.

In some instances, the reaction mixture thickens when the alcohol promoter is removed. In those cases, it is preferable that the reaction mixture be contacted with the acidic material for a sufficient period of time for the mixture to again become "thinner" or less viscous. The reason for the thinning of the reaction material with the continued contacting with the acidic material is not understood, but this thinning effect is readily observable in the product. Generally, contacting the acidic material with the reaction product after removal of the alcohol promoter for a period of one to six hours, usually two to four hours, produces the desired clear, filterable product.

The foregoing modified procedure is useful in preparing basic magnesium salts having metal ratios of up to about 15 but generally not in excess of about 10 to 12.

When it is desired to prepare basic magnesium salts having unusually high metal ratios, that is, in excess of 15 the process should be conducted in a step-wise procedure. That is, a first basic magnesium salt should be prepared as described above and then this basic magnesium salt should be employed with additional magnesium oxide, promoter, and the like to increase the metal ratio. In this manner, the metal ratio of the basic magnesium salts can be increased to about 30 or more. Usually, when the metal ratio is being increased by conducting the overbasing process in a series of two or more steps, the metal ratio is usually increased in increments of 5 to 15 and preferably in increments of about 8 to 12. Thus, if in the first step, a basic magnesium salt having a metal ratio of 10 is prepared and thereafter used as a starting material in a second step of the procedure, sufficient additional magnesium oxide will be added to provide a sufficient amount of magnesium to increase the metal ratio of the resulting product to about 15 to about 25. Obviously, the metal ratio can be increased by smaller units but this is inefficient. On the other hand, trying to increase the metal ratio by larger increments increases the tendency of the product to form a haze or to gel.

In these modified versions of the process of the present invention, that is, where the reaction mixture is contacted with the acidic material in two stages, it is essential for optimum results that the acidic material be contacted with the reaction components at a temperature of at least about 75° C. and preferably at a temperature of at least about 90° C. after removal of the alcohol promoter. As the free alcohol must be removed in these modified procedures, it is obvious why it is desirable that the alcohol promoter used in combination with water have a boiling point less than that of water. Otherwise, it is necessary to remove the water as well as the alcohol and then add water back to the mixture. Likewise, as explained above, the acidic material should be contacted with the remaining components of the reaction mixtures at temperatures of at least about 75° C. Accordingly, if any diluent of the mixture has a boiling point of less than this, it interferes with achieving this temperature. Increased pressure in such instances would permit elevation of the temperature but is easily avoided by selecting diluents having boiling points of at least 75° C. The maximum temperautre is limited only by the decomposition temperature of the reactants and product as explained above but usually will not exceed 200° C. Temperature of 90°–150° C. are preferred.

In a further modification of the process, it has been found useful to employ a combination of at least one oil-soluble aliphatic carboxylic acid and one other oil-soluble acid of the type described hereinabove to prepare basic magnesium salts. Thus, an organic acid mixture comprising at least one oil-soluble aliphatic carboxylic acid or other suitable derivative thereof as described above with at least one other organic acid susceptible to overbasing of the types described in detail hereinabove, e.g., on alkylated salicylic acid, a petrosulfonic acid, or an acid prepared from the condensation of phosphorus pentasulfide and polyisobutylene having a molecular weight of about 1000, is used according to this further modification as the "organic acid" to be overbased. Ordinarily, the aliphatic carboxylic acid per se or its alkali or alkaline earth metal salts inclding magnesium salts will be used. This modification can be used effectively with water and alcohol-water promoter systems. Generally, the aliphatic carboxylic acid or derivative thereof is employed in an amount such that there is one equivalent of the oil-soluble aliphatic carboxylic acid for each one to twenty, usually one to ten equivalents of the other organic acids present in the mixture, that is, an equivalent ratio of aliphatic carboxylic acid to other acid of about 1:1 to about 1:20 but generally 1:1 to about 1:10. The preferred ratio in the case of a combination of aliphatic carboxylic acids and sulfonic acids is an equivalent ratio of about 1:2 to about 1:5. The combination of acids results in a more efficient utilization of the magnesium oxide although the reason is not known.

It has also been determined that the presence of at least one oil-soluble sulfonic acid or suitable derivative thereof susceptible to overbasing, as described hereinbefore, is beneficial to the efficient utilization of magnesium and the preparation of products having higher metal ratios when preparing basic magnesium salts of at least one oil-soluble aromatic carboxylic acid or suitable derivatives thereof susceptible to overbasing such as those illustrated by Formulae I–III. This modification is very useful in preparing basic magnesium salts of hydroxy-substituted aromatic acids such as salicylic acids. These hydroxy-substituted aromatic acids are exemplified by those included within Formulae II and III. This combination of acids can be used advantageously with water as the only promoter or in an alcohol-water promotor system as described above. The sulfonic acid may be an aliphatic, cycloaliphatic, or an aromatic sulfonic acid or mixtures of two or more such acids or derivatives thereof susceptible to overbasing, especially those sulfonic acids illustrated by Formulae IV–V. The amount of aromatic carboxylic acid and sulfonic acid, or their suitable derivatives, used in combination is such that the ratio of equivalents is about 1:1 to about 20:1, preferably about 2:1 to about 15:1.

A preferred process for overbasing a combination of hydroxy-substituted aromatic carboxylic acids as described in the preceding paragraph corresponds to that desired above for overbasing the combination of organic acids and aliphaict carboxylic acids discussed hereinbefore. This preferred process comprises preparing basic magnesium salts by carbonating a mixture comprising (a) M equivalents of at least one member selected from oil soluble hydroxy-substituted aromatic carboxylic acids or equivalent derivatives thereof susceptible to overbasing, (b) N equivalents of at least one member selected from oil-soluble sulfonic acids and equivalent derivatvies thereof susceptible to overbasing, (c) Q equivalents of basically reacting magnesium oxide where the ratio of $M:N$ is about 1:1 to about 20:1 and the value of $$\frac{Q}{M+N}$$

is from about 1.1 to about 30 or more, usually not more than 20, and preferably about 2 to about 12 (d) water and (e) a substantially inert organic liquid medium until the reaciton between the carbon dioxide and the mixture substantially ceases. The modifications, variations, and preferences in the magnesium overbasing processes described herein are also applicable to the overbasing of M and N. Thus, aliphatic alcohols such as methanol or mixtures of methanol and other lower alkanols can be used as co-promoters. However, these co-promoters ordinarily may be deleted without adverse results (e.g., haze, gel formation) when preparing basic magnesium salts from oil-soluble hydroxy aromatic acids or their derivatives susceptible to overbasing. Likewise, xylene is a preferred diluent, the metal ratio is usually increased in increments of 5 to 15, the acids per se or their alkali or alkaline earth metal salts or mixtures thereof are usually employed as starting materials and so forth. Further, the process can be conducted stepwise, that is, more water and active magnesium oxide can be added and carbonation continued following the above procedure. This can be repeated until the desired metal ratio is reached. If desired, the reaction product can be filtered or subjected to other conventional purification techniques either between carbonation steps or upon completion of the last step.

While the primary purpose of this invention is to provide basic magnesium salts, it is obvious from the foregoing that magnesium is not necessarily the only metal present in the compositions produced. Other Group I and Group II metals may be present in the basic magnesium salts. Thus, if an alkali or alkaline earth metal salt other than a magnesium salt is employed as a starting material in the processes of this invention, the basic magnesium salt-containing product may comprise these other metals present in the starting materials. When metal salts are used as starting materials, the salts can be either neutral or basic. If basic, their metal ratios will not exceed about 10 except, of course, where the metal is magnesium. For example, neutral or basic calcium or barium petrosulfonates can be employed alone or with neutral or basic carboxylic acid alkali or alkaline earth metal salts as a starting material for preparing basic magnesium salts. Metal salts can be mixed with oil-soluble organic acids per se but, to the extent excess metal is present, it will generally neutralize the free acid and form neutral salts in situ. Furthermore, it is also contemplated that, in addition to the basically reacting magnesium oxide, other basically reacting Group II metal compounds can be used in combination with the magnesium oxide. Thus, mixtures of magnesium oxide and barium oxide and/or calcium oxide can be used to produce a basic salt containing magnesium, barium and/or calcium. Similarly magnesium oxide can be used in combination with other basically reacting compounds such as calcium hydroxide, calcium carbonate, barium hydroxide, cadmium oxide, strontium hydroxide, etc. Preferably, magnesium oxide will be employed alone as this generally produces the best results especially in making basic magnesium salts having metal ratios in excess of about 5 or 6.

Another variation contemplated as being within the scope of this invention is the alternate use of increments of magnesium oxide and at least one other basically reacting metal compound. For example, one or more increments of magnesium oxide can be used and the reaction mixture carbonated or contacted with other acidic materials as described above and then one or more increments of calcium hydroxide, calcium oxide, barium hydroxide, etc., can be added and the resulting mixture contacted with an acidic material. This stepwise and alternating use of different metals can be repeated until the desired metal ratio is achieved.

If other metals are present in the basic magnesium compositions produced according to the process of this invention, the amount of such other metals will be such as not to account for more than about 40% of the total metal ratio and, preferably, not more than 20%. The presence of these additional metals does not affect the utility of the basic magnesium salts in any of the uses described herein. It is often desirable to use the calcium and barium salts of the organic acids as starting materials in preparing the basic magnesium salts of this invention.

It is to be understood that the reactants employed in the processes of this invention can be brought together in any desired manner. Thus, magnesium oxide and water can be mixed and added to a mixture of the remaining starting materials. Or a mixture of the inert organic diluent and alcohol can be prepared and added to a mixture of acid, water, and magnesium oxide. Various other orders of addition and mixing are also possible. Moreover, the various reactants, diluents, and promoters need not be mixed in toto at one time prior to contacting the mixture with the acidic material but one or all may be introduced continuously over a period of time or in portions at regular or irregular intervals before or during the reaction with the acid material so long as the overall parameters of the processes as defined above are maintained.

The processes of the present invention are illustrated by the following examples representing preferred embodiments thereof. The products produced represent specific examples of the novel, oil-soluble basic magnesium salts of this invention.

EXAMPLE 1

A reaction mixture comprising 906 grams (1.5 equivalents) of an oil solution of alkylphenylsulfonic acid having (average molecular weight—450), 564 grams of mineral oil, 600 grams of toluene, 95.7 grams of magnesium oxide (4.4 equivalents), and 120 grams of water are carbonated at a temperature of about 78°–85° C. for about seven hours at a rate of about three cubic feet of carbon dioxide per hour during which time the reaction mixture is constantly agitated. The carbonation is stopped and the reaction product stripped by heating to 165° C. at a pressure of 20 mm. (Hg.). The stripped product is filtered. The filtrate is an oil-solution of the desired basic magnesium sulfonate having a metal ratio of about 3.

EXAMPLE 2

Following the general procedure of Example 1, a reaction mixture comprising 604 grams (1 equivalent) of an oil-solution of an alkylated benzenesulfonic acid (average molecular weight—450), 584 grams of mineral oil, 130 grams of magnesium oxide, 97 grams of water, and 500 grams of toluene are carbonated at 85°–90° C. (reflux) for about five hours at a rate of about 3 cubic feet of carbon dioxide per hour. The reaction mixture is dried by blowing with nitrogen for about four hours while raising the temperature to about 165° C. Thereafter, the reaction product is stripped to 165° C. at 50 mm. (Hg) and filtered. The filtration is an oil-solution of the desired basic magnesium salt characterized by a metal ratio of about 5.

EXAMPLE 3

A reaction mixture comprising 302 grams (0.5 equivalent) of an oil-solution of an alkylphenylsulfonic acid (average molecular weight—450), 139 grams (0.5 equivalent) of a mixture of oil-soluble fatty acids (tall oil acids sold by Hercules under the name Pamak-4), 196 grams (9 equivalents) of magnesium oxide, 735 grams of mineral oil, 440 grams of toluene, and 163 grams of water is carbonated at a temperature of about 85°–90° C. (reflux) at a rate of about 1.5 cubic feet of carbon dioxide per hour for about ten hours with stirring. The carbonated reaction product is then blown with nitrogen while heating to about 160° C. to remove water and toluene and finally stripped at reduced pressure at 160° C. The dried product is filtered. The basic magnesium salt is characterized by a metal ratio of about 5.4.

EXAMPLE 4

The general procedure of Example 3 is repeated utilizing 0.75 equivalent of the sulfonic acid, 0.25 equivalent of the tall oil acid mixture, and 9 equivalents of magnesium oxide, a basic magnesium salt is prepared having a metal ratio of about 8.6.

EXAMPLE 5

A reaction mixture comprising 348 grams (0.5 equivalent) of an oil solution of an alkylphenylsulfonic acid (average molecular weight—500), 240 grams of mineral oil, 600 grams of xylene, 108.5 grams (5 equivalents) of magnesium oxide, 117 grams of methanol, and 75 grams of water is carbonated at 65°–70° C. (reflux) at a rate of about 1.5 cubic feet per hour for about 1.5 hours at which time the rate of carbon dioxide uptake was less than 0.2 cubic foot per hour. Carbonation is continued at this rate while the temperature is raised to 95° C. to remove the methanol. After removal of the methanol, 75 grams of water are added to the mixture and carbonation is continued at about one cubic foot per hour at the reflux temperature (about 90° C.) until the carbon dioxide uptake rate was less than 0.1 cubic foot per hour. This point is reached in about 3.5 hours. The material is then dried by heating to 140° C. with continued carbonation and filtered. The filtrate is an oil-solution of the desired basic magnesium salt which is characterized by a metal ratio of about 8.6.

EXAMPLE 6

(A) A reaction mixture comprising 1044 grams (about 1.5 equivalents) of an oil solution of an alkylphenyl sulfonic acid (average molecular weight—500), 1200 grams of mineral oil, 2400 grams of xylene, 138 grams (about 0.5 equivalent) of the tall oil acid mixture described above, 434 grams (20 equivalents) of magnesium oxide, 600 grams of methanol, and 300 grams of water is carbonated at a rate of 6 cubic feet of carbon dioxide per hour at 65°–70° C. (methanol reflux). The carbon dioxide introduction rate was decreased as the carbon dioxide uptake diminished. After 2.5 hours of carbonation, the methanol is removed by raising the temperature of the mixture to about 95° C. with continued carbon dioxide blowing at a rate of about two cubic feet per hour for one hour. Then 300 grams of water is added to the reaction mixture and carbonation was continued at about 90° C. (reflux) for about four hours. The material becomes hazy with the addition of the water but clarifies after 2–3 hours of continued carbonation. The carbonated product is then stripped to 160° C. at 20 mm. (Hg) pressure and filtered. The filtrate is an oil solution of the desired basic magnesium salt, the salt being characterized by a metal ratio of about 10.

(B) Following the general procedure of (A) but adjusting the weight ratio of methanol to water in the initial reaction mixture to 4:3 in lieu of the 2:1 ratio of (A), another oil-solution of a basic magnesium salt is produced. This methanol-water ratio gives improved carbonation at the methanol reflux stage of carbonation and prevents thickeneing of the mixture during the 90° C. carbonation stage.

EXAMPLE 7

A reaction mixture comprising 135 parts mineral oil (all "parts" are parts by weight unless otherwise indicated), 330 parts xylene, 200 parts (0.235 equivalent) of a mineral oil solution of an alkylphenylsulfonic acid (average molecular weight 425), 19 parts (0.068 equivalent) of the above-described mixture of tall oil acids, 60 parts (about 2.75 equivalents) of magnesium oxide, 83 parts methanol, and 62 parts water are carbonated at a rate of 15 parts of carbon dioxide per hour for about two hours at the methanol reflux temperature. The carbon dioxide inlet rate is then reduced to about 7 parts per hour and the methanol is removed by raising the temperature to about 98° C. over a three-hour period. Then 47 parts of water are added and carbonation is continued for an additional 3.5 hours at a temperature of about 95° C. The carbonated mixture is then stripped by heating to a temperature of 140°–145° C. over a 2.5-hour period. This results in an oil solution of a basic magnesium salt characterized by a metal ratio of about 10.

Then, the carbonated mixture is cooled to about 60°–65° C. and 208 parts xylene, 60 parts magnesium oxide, 83 parts methanol and 62 parts water are added thereto. Carbonation is resumed at a rate of 15 parts per hour for two hours at the methanol reflux temperature. The carbon dioxide addition rate is reduced to 7 parts per hour and the methanol is removed by raising the temperature to about 95° C. over a three-hour period. An additional 41.5 parts of water are added and carbonation is continued at 7 parts per hour at a temperature of about 90°–95° C. for 3.5 hours. The carbonated mass is then heated to about 150°–160° C. over a 3.5-hour period and then further stripped by reducing the pressure to 20 mm. (Hg) at this temperature. The carbonated reaction product is then filtered. The filtrate is an oil-solution of the desired basic magnesium salt characterized by a metal ratio of 20.

EXAMPLE 8

A reaction mixture comprising 350 grams (0.5 equivalent) of an oil-solution of an alkylphenyl sulfonic acid (average molecular weight—450), 80 grams (about 4 equivalents) of magnesium oxide, 122 grams of ethanolamine, 680 grams of xylene, 100 grams of water, and 250 grams of mineral oil are carbonated at a rate of 3 cubic feet of carbon dioxide per hour at a temperature of 90°–100° C. for one hour. The carbonation is stopped, 25 grams of water added and the resulting carbonated mixture is refluxed for about 1.5 hours, stripped to 170° at 25 mm. (Hg), and filtered. The filtrate is an oil solution of the desired basic magnesium salt. The salt is characterized by a metal ratio of about 6.8.

EXAMPLE 9

A reaction mixture comprising 2900 grams (3 equivalents) of an oil solution of the magnesium salt of polyisobutylene (average molecular weight—480)-substituted salicyclic acids, 624 grams of mineral oil, 277 grams (1 equivalent) of the commercial mixture of tall oil acids described hereinabove, 1800 grams of xylene, 195 grams (9 equivalents) of magnesium oxide, and 480 grams of water are carbonated at the reflux temperature (about 95° C.) for one hour. The carbonated mixture is then stripped by first heating to 160° C. with nitrogen blowing (3 cubic feet per hour) and thereafter heating to 165° C. at a pressure of 30 mm. (Hg). This stripped carbonated product is filtered, the filtrate being an oil solution of the desired basic magnesium salt. The salt is characterized by a metal ratio of 2.7.

EXAMPLE 10

(a) To a thoroughly agitated mixture comprising 232 parts of alkylated benzene sulfonic acid (0.33 equivalent), 160 parts mineral oil diluent, 400 parts xylene, and 72 parts magnesium oxide (3.33 equivalents) heated to about 30° C., there is added 50 parts water and the temperature is increased to about 90°–95° C. This mixture is blown with $H_2S$ gas until the reaction with $H_2S$ substantially ceases as shown by the fact that the quantity of $H_2S$ evolving from the mixture is substantially equal to that being introduced into the mixture. Then, an additional 20 parts water is added and the $H_2S$ blown mixture is blown with carbon dioxide until the $CO_2$ uptake substantially ceases while maintaining a temperature of 85°–95° C. Water is removed as an azeotrope with xylene by heating the carbonated mixture to 140° C. with continued $CO_2$ blowing to assist in the water removal. The dried mixture is then filtered and the filtrate stripped to a temperature of 160° C. and a pressure of 40 mm. (Hg). The filtrate is a 30% oil solution of the desired basic magnesium salt having a metal ratio of about 6.4. The filtrate is characterized by a sulfur content of 2.93%, a sulfate ash content of 24.4% and a $CO_2$ content of 4.9%.

(b) Hydrogen sulfide gas is introduced via a submerged inlet line into a reaction mixture comprising 232 parts (0.33 equivalent) of the sulfonic acid of (a), 160 parts mineral oil diluent, 400 parts xylene, 72 parts (3.33 equivalents) magnesium oxide, 80 parts methanol, and 50 parts water while maintaining a temperature of 35°–40° C. until the $H_2S$ uptake substantially ceases. The temperature is then raised to 60° C. while $H_2S$ blowing is maintained. Upon reaching 60° C., $H_2S$ blowing is discontinued and $CO_2$ blowing is initiated and continued until the amount of $CO_2$ introduced substantially equals that existing the reaction mass. Then, the methanol is distilled while $CO_2$ blowing is continued. Fifty parts of water are added and the resulting mixture is carbonated at the reflux temperature (about 90° C.) for about four hours at which time the reaction mixture is clear and "thin," (i.e., has a low viscosity). Water is removed as an azeotrope with the xylene. The resulting dried mixture is then stripped to 160° C. at 20 mm. pressure, (Hg) and filtered. The filtrate is an oil solution of the desired basic magnesium salt having a metal ratio of about 8.3. The filtrate is further characterized by a sulfate ash content of 31.6%, a $CO_2$ content of 6.9%, and a sufur content of 2.25%.

If the process is terminated at the conclusion of the $H_2S$ blowing step and that product is stripped, filtered, etc., a non-carbonated basic magnesium salt-containing filtrate is produced.

EXAMPLE 11

A thoroughly agitated mixture comprising 232 parts (0.33 equivalent) of the alkylated benzene sulfonic acid of Example 5, 410 parts mineral oil diluent, 100 parts xylene, 72 parts (3.33 equivalents) magnesium oxide, 50 parts heptylphenol, 80 parts methanol, and 50 parts water is carbonated by blowing $CO_2$ through the mixture while maintaining the methanol reflux temperature until the $CO_2$ uptake substantially ceases. While carbonation is continued, the temperature is increased to 95° C. to distill off the methanol. An additional 50 parts water is added and the resulting mixture is carbonated an additional three and one-half hours at the reflux temperature (about 90° C.). The resulting mixture is filtered and the filtrate stripped to 165° C. at 40 mm. (Hg) pressure to produce an oil solution of the desired basic magnesium salt which is characterized by a metal ratio of about 8.5.

This example demonstrates the use of an auxiliary phenolic promoter in a process of this invention. It is contemplated that one or more other known phenolic promoters can be used in conjunction with the water-alcohol co-promoter system of the magnesium overbasing processes described herein without departing from the scope of the present invention.

When auxiliary phenolic promoters are used, the amount of phenolic promoter ordinarily should be such that the number of equivalents of phenolic promoter does not exceed the number of equivalents of alcohol co-promoter and preferably does not exceed about half the number of equivalents of alcohol co-promoter. Phenolic promoters have one equivalent per phenolic —OH group and alcohols have one equivalent per alcoholic —OH group. Thus monohydric alcohols such as methanol, ethanol, etc., have one equivalent per mole; dihydric alcohols have two equivalents per mole, etc. Likewise, alkylated phenols and alkylated naphthols have one equivalent per mole. Thus, monohydric phenols such as heptylphenols, octylphenols, nonylphenols, etc., have one equivalent per mole. Other suitable phenolic promoters include cetylphenols, octyl catechols, hexylphenols, triisobutyl naphthols, and the like.

EXAMPLE 12

(a) A mixture comprising 174 parts (0.25 equivalent) of an alkylated benzene sulfonic acid, 23 parts (0.083 equivalent) Pamak–4 fatty acid mixture, 199 parts mineral oil diluent, 250 parts Stoddard solvent, 72 parts (3.33 equivalents) magnesium oxide, 75 parts methanol and 72 parts water is carbonated at the reflux temperature (70°–75° C.) until the $CO_2$ uptake substantially ceases. Then the methanol is removed by distillation while $CO_2$ blowing is continued. After removal of the methanol, carbonation is continued at the reflux temperature of the remaining mixture for thirty minutes. Then the carbonated reaction mixture is stripped to 165° C. at 20 mm. (Hg) pressure and filtered. The filtrate is an oil solution of the desired basic magnesium salt having a metal ratio of about 8.5. The filtrate has a sulfate ash content of 32.5%.

(b) The general procedure of (a) is repeated but the amount of Stoddard solvent is increased to 400 parts and the amount of methanol is increased to 100 parts. The amount of water initially employed is reduced to 50 parts. After removal of the methanol, 50 additional parts of water are added and carbonation is continued for 3.5 hours. The filtrate is characterized by a sulfate ash content of about 36.3% and contains the desired basic magnesium salt having a metal ratio of about 9.5.

(c) The procedure of (a) is repeated substituting sulfur dioxide for carbon dioxide to produce a non-carbonated basic magnesium salt.

EXAMPLE 13

Following the procedure of Example 12(b), a mixture containing 218 parts (0.25 equivalent) of alkylated benzene sulfonic acid, 25 parts (0.083 equivalent) of isostearic acid, and 72 parts (3.33 equivalents) of magnesium oxide is carbonated to produce a filtrate having a sulfate ash content of 36.6% and containing a basic magnesium salt having a metal ratio of about 9.6.

EXAMPLE 14

(a) A mixture comprising 1313 parts (1.5 equivalents) of an alkylated benzene sulfonic acid having an equivalent weight of 875, 138 parts (0.5 equivalent) of the commercial mixture of carboxylic acids described in Example 3, 432 parts (20 equivalents) magnesium oxide, 921 parts mineral oil diluent, 2400 parts xylene, 600 parts methanol, and 300 parts water is carbonated at about 70° C. until $CO_2$ uptake substantially ceases. While maintaining carbon dioxide blowing, the methanol is removed by distillation and 400 parts water are added. Carbonation is continued while maintaining a temperature of about 90° C. until the $CO_2$ uptake again substantially ceases. The resulting carbonated mass is then stripped to 165° C. at 20 mm.(Hg) pressure and filtered. The filtrate is an oil solution of the desired basic magnesium salt having a metal ratio of 10. The filtrate is further characterized by a $CO_2$ content of about 9.1% and a sulfate ash content of about 38.6%.

(b) A mixture comprising 422 parts of the filtrate of (a), 40 parts mineral oil, 400 parts xylene, 37 parts magnesium oxide, 100 parts methanol, and 50 parts water is carbonated at the reflux temperature (65°–70° C.) until the $CO_2$ uptake substantially ceases. While continuing carbonation the methanol is removed by distillation and then 50 parts water are added. The temperature is increased to about 90° C. and the $CO_2$ blowing is maintained until the $CO_2$ uptake again substantially ceases. The carbonated material is stripped to 160° C. at 40 mm. (Hg) pressure and filtered. The filtrate is an oil solution of the desired basic magnesium salt having a metal ratio of about 16.3. The filtrate is further characterized by a sulfate ash content of about 52.3% and a $CO_2$ content of about 12.4%.

(c) Th procedure of (b) is repeated using 522 parts of the filtrate of (a) and 36 parts of magnesium oxide. The filtrate is characterized by a sulfate ash content of about 47.7% and a $CO_2$ content of about 11.6%. The basic magnesium salt has a metal ratio of about 15.

(d) The procedure of (c) is repeated using 72 parts magnesium oxide. The filtrate is characterized by a sulfate ash content of about 58.5% and a $CO_2$ content of about 14.2%. The basic magnesium salt has a metal ratio of 20.

(e) The procedure of (c) is repeated using 88 parts magnesium oxide. The filtrate is an oil solution of the desired basic magnesium salt having a metal ratio of about 22.

(f) The procedure (c) is repeated using 570 parts of the filtrate of (c) in lieu of the filtrate of (a) and 100 parts mineral oil diluent in lieu of 30. The resulting filtrate is a mineral oil solution of the desired basic magnesium salt having a metal ratio of about 27.

EXAMPLE 15

(a) A mixture comprising 801 parts (3 equivalents) of the carboxylic acid mixture described in Example 3, 198 parts (9 equivalents) of magnesium oxide, 900 parts of xylene, 900 parts mineral oil diluent, and 360 parts water is carbonated at about 95° C. until the $CO_2$ uptake substantially ceases. While maintaining the $CO_2$ blowing, the reaction mixture is stripped to 160° C. at 20 mm. (Hg) pressure and filtered. The filtrate is an oil solution of the desired basic magnesium carboxylates (metal ratio—about 2.4) and is characterized by a sulfate ash content of about 21.5%.

(b) The general procedure of (a) is repeated but 300 parts of methanol are incorporated into the original mixture and the amount of water present is reduced to 225 parts. The carbonation is conducted in two stages, the first at 55°–65° C. and the second, after the methanol is distilled off and 75 parts water are added, about 90°–95° C. After stripping and filtration, the filtrate is characterized by a sulfate ash content of about 22.7% and the basic magnesium salt is characterized by a metal ratio of about 2.5.

(c) The procedure of (b) is repeated using a 300 parts of an equimolar mixture of methanol and isopropanol with substantially the same results.

EXAMPLE 16

(a) A magnesium sulfonate is prepared by heating a mixture of 4122 parts (6 equivalents) of the sodium salt of an oil-soluble alkyl benzene sulfonic, 1960 parts mineral oil diluent, 300 parts magnesium chloride ($MgCl_2$), and 600 parts water at 80°–110° C. for about three hours. The reaction mixture is then stripped while blowing with nitrogen and filtered.

(b) A mixture comprising 1530 parts (1.5 equivalents of acid moiety) of the filtrate of (a), 138 parts (0.5 equivalent) of the commercial mixture of carboxylic acids described in Example 3, 390 parts (18 equivalents) of magnesium oxide, 708 parts mineral oil diluent, 2400 parts xylene, 600 parts water and 600 parts methanol is carbonated at about 70°–75° C. until the $CO_2$ uptake substantially ceases. The methanol is then distilled off and 300 parts additional water added without interrupting the $CO_2$ blowing. When the $CO_2$ uptake again substantially ceases, the carbonated mixture is stripped to 165° C. at 20 mm. (Hg) pressure and filtered. The filtrate is characterized by a sulfate ash content of 37.1% and contains the desired basic magnesium salt (metal ratio—about 9.7).

(c) To a mixture of 1380 parts (2 equivalents) of the sodium salt of an alkylated benzene sulfonic acid, 138 parts of the carboxylic acid mixture described in Example 3, and 2400 parts xylene, there is added 100 parts (2.1 equivalents) of $MgCl_2$ dispersed in 600 parts methanol. The mixture is heated at about 50° C. for one hour. Subsequently, 390 parts (18 equivalents) of magnesium oxide and 544 parts water are added and carbonation is commenced while maintaining a temperature of about 70° C. After the $CO_2$ uptake substantially ceases, the methanol is distilled off and 300 parts water are added, during which carbon dioxide blowing is continued while maintaining a temperature of about 90° C. When the $CO_2$ uptake again substantially ceases (i.e., $CO_2$ introduced is one standard cubic foot per hour and that evolving from the reaction mass is about 0.9 standard cubic feet), the reaction mixture is stripped to 165° C. at 20 mm. (Hg) pressure and filtered. The filtrate has a sulfate ash content of 26.5% and the basic magnesium salt is characterized by a metal ratio of about 5.5.

(d) The procedure of (c) is repeated substituted 860 parts ethanol for the 600 parts methanol. The first carbonation is conducted at about 78°–80° C.

EXAMPLE 17

A mixture comprising 1330 parts of a 58% mineral oil solution of a normal barium petrosulfonate containing 0.25 equivalent of petrosulfonic acid (in the form of the barium salt), 23 parts (0.08 equivalent) of the carboxylic acid mixture of Example 3, 7.5 parts (0.08 equivalent) of barium hydroxide monohydrate, 95 parts mineral oil diluent and 400 parts xylene is heated at about 50° C. Then 100 parts methanol is added followed by 72 parts (3.3 equivalents) magnesium oxide and finally, 60 parts water. The resulting mixture is carbonated at 60°–65° C. until the $CO_2$ uptake substantially ceases. The carbonated mass is then stripped to 165° C., blown with nitrogen at that temperature for one hour, and filtered. The filtrate is a 48.8% oil solution of the desired basic magnesium salt and is characterized by a sulfate ash content of 35.8%, and a barium content of about 3.9%. The metal ratio of the salt is 9.35. The theoretical ratio based on the total equivalents of barium and magnesium employed is 11.

EXAMPLE 18

A mixture comprising 448 parts (0.4 equivalent) of a phosphorous-containing acid having a sulfur content of 2.75% prepared by hydrolyzing the reaction product of 1000 parts of polyisobutylene (having an average molecular weight of 1000) and 90 parts of $P_2S_5$ reacted at 260° C. (according to conventional procedures for preparing such acids), 30 parts (0.04 equivalent) of an alkylated benzene sulfonic acid, 52 parts (2.4 equivalents) of magnesium oxide (Dow calcined magnesite), 80 parts mineral oil diluent, 500 parts xylene, 100 parts methanol, and 100 parts water is carbonated until the $CO_2$ uptake substantially ceases. The carbonated material is stripped to 160° C. while continuing $CO_2$ blowing and then filtered. The filtrate is an oil solution of the desired basic magnesium salt. The salt is characterized by a metal ratio of about 2.4.

EXAMPLE 19

(a) A mixture comprising 1615 parts (2.33 equivalents) of alkylated benzene sulfonic acids, 200 parts (0.77 equivalent) of Century 1210 carboxylic acids, 585 parts (27 equivalents) of magnesium oxide (Dow calcined magnesite), 1356 parts mineral oil diluent, 3200 parts xylene, 800 parts methanol, and 400 parts water is carbonated at the methanol reflux temperature until the $CO_2$ uptake substantially ceases. The carbonated material is stripped to 95° C. to remove methanol and 400 parts water are added. The resulting mixture is then carbonated at about 100° C. until the $CO_2$ uptake again substantially ceases. Then the mixture is stripped to 180° C. at 38 mm. (Hg) pressure and filtered. The filtrate is characterized by a sulfate ash content of about 38.8%. The basic magnesium salt is characterized by a metal ratio of about 8.4.

(b) The procedure of (a) is repeated using 0.77 equivalent of Hydrex 440 carboxylic acids in lieu of the Century 1210 acids. The basic magnesium salt has a metal ratio of about 8.7 and the filtrate is characterized by a sulfate ash content of about 38.4%.

Century 1210 and Hydrex 440 are the names of carboxylic acid mixtures available from the Harchem Division of Pennwalt Corporation. The manufacturer's analysis (approximate percent by weight composition) of each product is as follows: Century 1210: 1.5% myristic acid, 0.5% pentadecylic acid, 52% palmitic acid, 1.5% margaric acid, 37.5% stearic acid, and 7.0% oleic acid. Hydrex 440: 4% myristic acid, 0.5% pentadecylic acid, 29% palmitic acid, 1.5% margaric acid, 56.5% stearic acid, 1% arachidic acid, 0.5% palmitoleic acid, and 7.0% oleic acid.

EXAMPLE 20

(a) To a mixture comprising 776 parts of a 60% oil solution of neutral calcium petrosulfonate containing 0.67 equivalent of petrosulfonic acid as the calcium salt, 46 parts (0.17 equivalent) of the carboxylic acid mixture of Example 3, 800 parts xylene, and 150 parts methanol, there is added 130 parts magnesium oxide followed by 250 parts water. The resulting mixture is carbonated at 60°–62° C. until the $CO_2$ uptake substantially ceases. Then the carbonated material is stripped to 160° C. at 25 mm. (Hg) pressure and filtered. The filtrate is characterized by a sulfate ash content of 36.1% and contains the desired calcium-containing basic magnesium salt (metal ratio—7.4).

(b) The general procedure of (a) is repeated but 6 parts (0.16 equivalent) of calcium hydroxide is added to the initial mixture and the mixture is heated to 50° C. before adding the magnesium oxide and water and carbonating. The calcium-containing basic magnesium salt has a metal ratio of 7.4 and the filtrate is characterized by a sulfate ash content of about 36.4%.

EXAMPLE 21

(a) Neutral magnesium salts of polyisobutenyl (average molecular weight—300)-substituted salicyclic acids are prepared by a double decomposition reaction involving mixing 7850 parts of a 43% mineral oil solution of the corresponding potassium salt, containing about 7.5 equivalents of the acid in the form of the potassium salt, with 500 parts toluene and 770 parts (7.6 equivalents) of $MgCl_2 \cdot 6H_2O$ in 500 parts water and heating at reflux for about two hours. The resulting mixture is stripped to 160° C. while blowing with nitrogen and filtered.

(b) A mixture comprising 2900 parts of the filtrate of (a) containing 3 equivalents of acid as the neutral magnesium salt, 300 parts (1 equivalent) isostearic acid, 195 parts (9 equivalents magnesium oxide), 600 parts mineral oil, 1800 parts xylene, and 480 parts water is carbonated at the reflux temperature until the $CO_2$ uptake substantially ceases. The material is stripped to 160° C. with nitrogen blowing to 28 mm. (Hg) pressure and filtered. The filtrate is a 45.3% oil solution of the desired basic magnesium salt which has a metal ratio of about 2.8. The sulfate ash content of the filtrate is 16.2%.

(c) The procedure of (b) is repeated substituting 1 equivalent of Century 1210 acid for the isostearic acid. The filtrate has a sulfate ash content of 16.3%.

(d) The procedure of (b) is repeated substituting 1 equivalent of Hydrex 440 for the isostearic acid. The filtrate has a sulfate ash content of 16.5%.

EXAMPLE 22

A mixture comprising 512 parts of the filtrate of Example 21(a) containing 0.5 equivalent of polyisobutenyl-substituted salicylic acid as the neutral magnesium salt, 31 parts of a mineral oil solution of alkylated benzene sulfonic acids containing 0.037 equivalents of sulfonic acid, 22 parts (1 equivalent) of magnesium oxide, 250 parts xylene, and 60 parts water is carbonated, stripped, and filtered according to the general procedure of Example 10(b). The filtrate is a 38% oil solution of the desired basic magnesium salt which has a metal ratio of about 2.7. The filtrate is characterized by a sulfate ash content of about 14.7%.

EXAMPLE 23

(a) A mixture comprising 277 parts (1 equivalent) of the carboxylic acid mixture of Example 3, 179 parts (8.2 equivalents) magnesium oxide, 179 parts water, 179 parts methanol, 615 parts xylene, and 393 parts mineral oil diluent is carbonated at 60°–70° C. until the $CO_2$ uptake substantially ceases. The methanol distilled off by heating to 95° C. with continued $CO_2$ blowing and 175 parts water are added. Carbon dioxide blowing is continued at 90°–95° C. until the $CO_2$ uptake again substantially ceases. While maintaining the $CO_2$ blowing the carbonated mass is stripped to 160° C. and subsequently filtered. The filtrate is a 40% oil solution of the desired basic magnesium salts (metal ratio of 3.8) and is characterized by a sulfate ash content of 23.1%.

(b) The procedure of (a) is repeated with the following modifications. The amount of xylene is increased to 816 parts and the amount of methanol is increased to 250 parts while the amount of water pressure in the initial mixture is 125 parts. After removal of the methanol, 50 parts water and 100 parts butyl alcohol are added and carbonation is continued at 80°–84° C. until the $CO_2$ uptake again substantially ceases. After stripping and filtration, a 40% oil solution of the desired basic magnesium salt (metal ratio—3.5) is obtained and is characterized by a sulfate ash content of 21.5%.

This example illustrates preparation of the basic magnesium salt using two different alcohols as co-promoters with water. The butyl alcohol permits a higher carbonation temperature. A hexyl, pentyl, heptyl alcohol etc., could also have been used. Furthermore the butyl alcohol and methanol could have been employed as a mixture of alcoholic co-promoters initially and the methanol selectively distilled off with the same results. Such variations as these are contemplated as being within the scope of the present inventions.

EXAMPLE 24

(a) To a mixture comprising 190 parts (0.25 equivalent) of alkylated benzene sulfonic acid, 400 parts xylene, 157 parts mineral oil diluent, 23 parts (0.083 equivalent) of the carboxylic acid mixture described in Example 3, and 72 parts (3.33 equivalents) magnesium oxide heated to about 50° C. there is added 100 parts methanol and 75 parts water. The temperature is maintained at 50°–60° C. while carbonating via a submerged $CO_2$ inlet line until the $CO_2$ uptake substantially ceases. The methanol is distilled off with continued $CO_2$ blowing and 50 parts water added. The $CO_2$ blowing is continued at a temperature of about 90° C. until the $CO_2$ uptake again substantially ceases. The carbonated mass is then stripped to 160° C. at 25 mm. (Hg) pressure. To the stripped mixture there is added 26 parts polyisobutenyl (average molecular weight—1000)-substituted succinic anhydride. The resulting mixture is heated at about 160° C. with nitrogen blowing for about one-half hour and filtered. The filtrate is characterized by a sulfate ash content of about 37.8% and the basic magnesium salt thus produced has a metal ratio of about 9.9. The purpose of the succinic anhydride is to improve the solubility of the basic magnesium salts, particularly on long-standing in storage, and to improve their water-tolerance capabilities, e.g., their ability not to form emulsions or precipitate in the presence of contaminating amounts of water encountered in storage and use.

(b) The procedure of (a) is repeated using sulfur dioxide gas ($SO_2$) in lieu of carbon dioxide to produce the desired non-carbonated basic magnesium salt.

In lieu of the polyisobutenyl-substituted succinic acid anhydride other oil-soluble high-molecular weight mono- or polycarboxylic acids, their anhydrides containing about 30–700 aliphatic carbon atoms, and/or acylated nitrogen compounds and esters derived therefrom can be used to improve the lubricating oil and fuel solubility characteristics of the basic magnesium salts of this invention. Preferably, such material used to improve the solubility will contain at least about fifty aliphatic carbon atoms. The "solubility improvers" constitute an art-recognized class of compounds used extensively as detergent-dispersants in lubricants and fuels and/or as intermediates in their preparation. For example, polyolefin-substituted acrylic acids, methacrylic acids, and succinic acids and their equivalent acylating derivatives have been reacted with various amine compounds such as alkylene polyamines, aminoalkyl piperazines, etc., to produce amides and imides used extensively as lubricating oil additives. Similarly, the acylating agents can be reacted with polyhydric alcohols, polyoxyalkylene glycols, etc. to produce esters useful as fuel and lubricant additives. These detergent-dispersants and/or their intermediates are disclosed in such U.S. patents as 3,346,354; 3,341,542; 3,272,746; 3,219,666; 3,216,936; 3,200,107; 3,172,892; 3,288,714; 3,381,022; and 3,331,776, all of which are incorporated herein for the sake of brevity. While the foregoing examples demonstrate the addition of the anhydride after carbonation and stripping are complete, such solubility improvers can be employed in any step in the procedure from the initial reaction mixture to addition after filtration. In fact, if a tendency to haziness or gelation is encountered, the solubility improver can be employed advantageously at that point (or just prior to that point) in the procedure where the haziness or gelation arises. Ordinarily the solubility improver, if employed, will be used in amounts of from about 0.1% to about 20% by weight based on the total weight of the composition. Amounts of about 1%–10% are particularly useful. Obviously, since the solubility improvers are useful lubricant and fuel additives, their presence in the final product is not detrimental to the utility of the basic magnesium salts.

EXAMPLE 25

(a) A mixture comprising 394 parts (0.5 equivalent) of a 16% oil solution of alkylated benzene sulfonic acid, 46 parts (0.16 equivalent) of the carboxylic acid mixture of Example 3, 614 parts mineral oil diluent, 500 parts xylene, and 100 parts water is heated to 50° C., 144 parts (6.65 equivalents) magnesium oxide is added, and the resulting mixture is heated at 50°–60° C. for about one-half hour. Then 133 parts boric acid ($H_3BO_3$) is added and the reaction mixture is heated at reflux (about 97° C.) for two hours. The temperature is elevated to 160° C. during which time water and xylene distill off and the mass is heated at that temperature for six hours. The reaction product is then stripped to 170° C. at a pressure of 30 mm. (Hg) and filtered twice to produce 200 parts of filtrate which is an oil-solution of the desired basic magnesium salt. The salt is characterized by a metal ratio of 6.5 (based on the sulfonic acid) and the filtrate has a sulfate ash content of about 20.8% and a boron content of about 1.09%.

(b) To a mixture containing 394 parts (0.5 equivalent) of a 16% oil solution of alkylated benzene sulfonic acid, 46 parts (0.16 equivalent) of the carboxylic acid mixture of Example 3, 314 parts mineral oil diluent, 600 parts xylene, and 100 parts water heated to about 50° C. there is added 144 parts (6.65 equivalents) of magnesium oxide. This mixture is heated at reflux for one hour and 248 parts boric acid are added. The boric acid containing mixture is heated at reflux for 3.5 hours, the last 2.5 hours being accompanied by carbon dioxide blowing until the $CO_2$ uptake substantially ceases. Water is then removed by distillation and the resulting mixture filtered. The filtrate is stripped to 155° C. to 25 mm. (Hg) pressure. The filtrate is an oil solution of the desired basic magnesium salt and is characterized by a boron content of about 2.6%, a $CO_2$ content of 0.59%, and a sulfate ash content of 31.3%. The metal ratio of the salt (based on the sulfonic acid) is about 8.2.

EXAMPLE 26

To a mixture comprising 448 parts (0.4 equivalent) of the phosphorus acid described in Example 18, 30 parts (0.04 equivalent) of the alkylated benzene sulfonic acid oil solution of Example 25(a), 500 parts xylene, and 80 parts mineral oil diluent heated to about 60° C., there is added 100 parts methanol, 24 parts (1.1 equivalent) of magnesium oxide, and 100 parts water. This mixture is carbonated at 60°–70° C. until the $CO_2$ uptake substantially ceases. The reaction mixture is stripped first to 120° C. with continued carbon dioxide blowing and then to 160° C. at 50 mm. (Hg) pressure with nitrogen blowing. Upon filtration, 555 parts of filtrate are recovered, the filtrate being an oil solution of the desired basic magnesium salt. The filtrate has a magnesium content of about 1.78% and the basic magnesium salt has a metal ratio of about 2.

From the foregoing description of the invention and the illustrative examples, it is apparent that the total amount of magnesium oxide employed need not be incorporated into the basic magnesium salts for the process and/or product to be within the contemplation of this invention. Generally speaking, all that is necessary is that an overall stoichiometric excess of magnesium oxide be employed in the processes and that the basic magnesium salts be characterized by a metal ratio of at least 1.1 as long as the other parameters discussed above are met. In fact, it is often advantageous to employ greater amounts of magnesium oxide than is actually to be incorporated in the basic magnesium salts to achieve higher metal ratios and/or shorter reaction periods.

As is apparent, other embodiments of this invention are readily achieved by substituting other acids, diluents, inorganic acidic materials, and alcohol promoters for all or a portion of those used in the foregoing illustrative examples using as a guideline for such substitution the general description of the invention set forth hereinabove.

In the foregoing examples, carbon dioxide, hydrogen sulfide and sulfur dioxide is introduced into the reaction mass as a gas via a submerged inlet line. Obviously other inorganic acidic gases can be introduced in a similar manner. If the acidic material is a liquid organic or inorganic acid, it can be introduced continuously over a specified period of time, dropwise, in periodic increments, or all at once depending on which procedure produces the best results for the specific combination of inorganic acid, organic acid, acid and promoter.

The order of combining the reactants is not critical although in a given combination of acids, promoters, and diluents, a particular reaction order may help achieve optimum results. It should be clear, therefore, that the various components of the reaction mixture can be brought together in various combinations e.g., acids and diluent, diluent and promoters, acids and promoters, magnesium oxide and water, or magnesium oxide and diluent and these separate combinations mixed together to form the reaction mixture. It should also be noted that freshly formed magnesium hydroxide can be substituted for all or a portion of the magnesium oxide used in the processes of this invention. Freshly formed magnesium hydroxide can be prepared by mixing water and magnesium oxide separately and adding the magnesium hydroxide thus formed to the reaction mixture. Magnesium hydroxide, like magnesium oxide, has two equivalents of magnesium per mole.

The basic magnesium salts are primarily useful as additives for fuels and lubricants and can be employed in the same manner as the known basic salts of the prior art, for example as described in U.S. Pats. 2,585,520; 2,739,- 124; 2,895,913; 2,889,279; 3,149,074; 3,150,089; and 3,235,494. In lubricants, such as crankcase lubricating oils, the basic magnesium salts function as detergents and promote engine cleanliness and reduce wear mainly by neutralizing acidic products such as those formed by the oxidation of the oil components or during combustion. The acidic materials if not neutralized, lead to increased engine wear and the formation of lacquer on engine parts. The basic magnesium salts disperse insoluble materials formed in the lubricant as a result of fuel combustion or oil oxidation thus reducing sludge. The basic magnesium salts also reduce or eliminate preignition tendency in gasoline fueled engines relative to, for example, basic calcium or barium salts when employed as lubricant or fuel additives.

When utilized as lubricant additives, the basic magnesium salts will be employed in amounts such that the magnesium sulfate ash content of the lubricant will vary from about 0.05% to 15% by weight of the total composition depending on the particular application. Thus, in crankcase oil for most internal combustion engines, the magnesium sulfate ash content will vary between 0.1%–5% and usually between 0.1%–2.5%. On the other hand, in marine diesel lubricants where it is customary to employ large amounts of basic salts, an ash level of up to 15% by weight, or even more, is not out of the question, although ash levels of 5%–10% are more frequent. Thus, most lubricant compositions will have a magnesium sulfate ash content of about 0.1% to about 10% by weight.

However, it is contemplated that the basic salts of this invention may be used in combination with other conventional additives including other normal or basic metal salts. Accordingly, the amount of sulfate ash present in the lubricant attributable to the basic magnesium salt can be varied easily by those skilled in the art to obtain the desired overall sulfate ash content.

Other conventional additives which can be used in combination with the basic magnesium salts include ashless dispersants of the type disclosed in U.S. Pats. 3,172,892; 3,219,666; 3,381,022; neutral and basic calcium and barium petrosulfonates; corrosion-inhibitors, oxidation inhibitors, antifoam agents, viscosity index improvers, pourpoint depressants, and the like, such as chlorinated wax, benzyldisulfide, sulfurized sperm oil, sulfurized terpene; phosphorous esters such as trihydrocarbon phosphites; metal thiocarbamates such as zinc dioctyldithiocarbamate; metal phosphorusdithioates such as zinc dioctylphosphorodithioate; polyisobutylene having an average molecular weight of 100,000; etc.

The additives of this invention can be effectively employed in a variety of lubricating compositions based on diverse oils of lubricating viscosity such as a natural or synthetic lubricating oil, or suitable mixtures thereof. The lubricating compositions contemplated include principally crankcase lubricating oils for spark-ignited and compression-ignited internal combustion engines including automobile and truck engines, two-cycle engine lubricants, aviation piston engines, marine and railroad diesel engines, and the like. However, automatic transmission fluids, transaxle lubricants, gear lubricants, metal-working lubricants, hydraulic fluids, and other lubricating oil and grease compositions can benefit from the incorporation of the present additives.

Natural oils include animal oils and vegetable oils (e.g., castor oil, lard oil) as well as solvent-refined or acid-refined mineral lubricating oils of the paraffinic, naphthenic or mixed paraffinic-naphthenic types. Oils of lubricating viscosity derived from coal or shale are also useful base oils. Snythetic lubricating oils include hydrocarbon oils and halo-substituted hydrocarbon oils such as polymerized and interpolymerized olefins (e.g. polybutylenes, polypropylenes, propyleneisobutylene copolymers, chlorinated polybutylenes, etc.); alkyl benzenes (e.g., dodecylbenzenes, tetradecylbenzene, dinonylbenzenes, di-(2-ethylhexyl)benzenes, etc.); polyphenyls (e.g., biphenyls, terphenyls, etc.); and the like. Alkylene oxide polymers and interpolymers and derivatives thereof where the terminal hydroxyl groups have been modified by esterification, etherfication, etc., constitute another class of known synthetic lubricating oils. These are exemplified by the oils prepared through polymerization of ethylene oxide or propylene oxide, the alkyl and aryl ethers of these polyoxyalkylene polymers (e.g., methylpolyisopropylene glycol ether having an average molecular weight of 1000, diphenyl ether of polyethylene glycol having a molecular weight of 500–1000, diethyl ether of polypropylene glycol having a molecular weight of 1000–1500, etc.) or mono- and polycarboxylic esters thereof, for example, the acetic acid esters, mixed $C_3$–$C_8$ fatty acid esters, or the $C_{13}$ oxo acid diester of tetraethylene glycol. Another suitable class of synthetic lubricating oils comprises the esters of dicarboxylic acids (e.g., phthalic acid, succinic acid, maleic acid, azelaic acid, suberic acid, sebacic acid, fumaric acid, adipic acid, linoleic acid dimer, etc.) with a variety of alcohols (e.g., butyl alcohol, hexyl alcohol, dodecyl alcohol, 2-ethylhexyl alcohol, pentaerythritol, etc.). Specific examples of these esters include dibutyl adipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethyl-hexanoic acid, and the like. Silicon-based oils such as the polyalkyl-, polyaryl-, polyalkoxy-, or polyaryloxy-siloxane oils and silicate oils comprise another useful class of synthetic lubricants (e.g., tetraethyl-silicate, tetraisopropyl-silicate, tetra-(2-ethylhexyl)-silicate, tetra-(4-methyl-2-tetraethyl) - silicate, tetra-(p-tert-butylphenyl) - silicate, hexyl - (4-methyl-2-pentoxy) - disiloxane, poly(methyl) - siloxanes, poly(methylphenyl)-siloxanes, etc.). Other synthetic lubricating oils include liquid esters of phosphorus-containing acids (e.g., tricresyl phosphate, trioctyl phosphate, diethyl ester of decane phosphonic acid, etc.), polymeric tetrahydrofurans, and the like.

When used as fuel additives, the basic magnesium salts will be employed in amounts sufficient to provide magnesium sulfate ash contents of 0.0001% to about 1%, usually 0.0001% to 0.5% by weight in petroleum distillate fuels. When employed in these normally liquid petroleum distillate fuels, e.g., fuel oils, diesel fuels, gasolines, aviation gasoline, aviation jet fuels, etc., they promote engine cleanliness, particularly of the fuel system such as fuel lines, carburetors, injectors, pumps and the like. In furnace fuel oils, for example, they serve as antiscreen clogging agents. Furthermore, in diesel fuels and other fuels which tend to produce black exhaust smoke in diesel engines, the basic magnesium salts suppress the formation and evolution of these black exhaust smokes in the manner described in German Auslegeschrift 1,243,-915 and 1,273,265 and U.S. Pat. 3,437,465. Likewise, the basic magnesium salts produced according to the processes of the present invention can be employed as vanadium scavengers in furnaces and other devices which burn residual fuel oils by introducing the basic magnesium salts into the combustion zone in the form of an oil or fuel solution or as an additive in the residual fuel. When used as vanadium scavengers, the basic magnesium salts are advantageously employed in combination with particulate aluminum oxide having an average particle size less than ten microns.

It is also contemplated that the basic magnesium salts will be employed in fuels in combination with other conventional fuel additives such as de-icers, antiknock agents, other smoke suppressants, and the like. When basic magnesium salts are prepared for use in fuels according to the processes of the present invention, it is sometimes desirable to use non-mineral oil diluents exclusively (e.g., xylene, toluene, heptane, naphtha, or other such diluents as described hereinbefore) and to retain the basic magnesium salts produced as solutions in these diluents. Of course, combinations of these non-mineral oil diluents and mineral oil can be used as in the described processes. However, it may be helpful to retain the non-mineral oil diluent in the final product rather than remove it as is done in the above illustrative examples. The mineral oils are sometimes undesirable in fuels as they lead to the formation of undesirable carbonaceous deposits on exhaust valves, etc. Moreover, the non-mineral oil diluents facilitate mixing of the basic magnesium salt solutions and fuels.

The following are examples of specific lubricants or fuels incorporating the basic magnesium salts of this invention. Unless otherwise indicated, "percent" and "parts" as used in the specification and claims means "percent by weight" or "parts by weight."

COMPOSITION A

SAE 30 mineral lubricating oil containing 0.35% magnesium sulfate ash as the filtrate of Example 1 and 0.25% calcium sulfate ash as a basic calcium petrosulfonate.

COMPOSITION B

SAE 10W–30 mineral lubricating oil containing .9% magnesium sulfate ash as the filtrate of Example 6(B) and 0.06% by weight phosphorus as zinc di-n-octylphosphorodithioate.

COMPOSITION C

SAE–10 mineral lubricating oil containing 0.75% of the ester prepared by reacting in a 1:1 mole ratio polyisobutenyl (average molecular weight—1100) substituted succinic anhydride and pentaerythritol, 1.5% magnesium sulfate ash as the filtrate of Example 7, 0.075% phosphorus as the adduct of zinc di-cyclohexylphosphorodithioate treated with 0.3 mole of ethylene oxide, 2% sulfurized sperm oil having a sulfur content of 10%, 3.5% of a poly-(alkylmethacrylate) viscosity index improver, 0.02% of a poly-(alkylmethacrylate) pour point depressant, and 0.003% of a poly-(alkyl siloxane) antifoam agent.

COMPOSITION D

Diesel fuel containing 0.1% magnesium sulfate ash as the filtrate of Example 6(A).

COMPOSITION E

Gasoline containing 0.001% magnesium sulfate ash as the filtrate of Example 9.

Other specific lubricants and fuels are readily prepared in accordance with the instructions set forth in the above discussion.

As used in the present specification, all percentages and "parts" refer to percent by weight and parts by weight unless otherwise indicated.

What is claimed is:

1. The process for preparing oil-soluble basic magnesium salts comprising intimately contacting at a temperature of about 25° C. up to the decomposition temperature at least one acidic material with a mixture comprising:
   (a) At least one member selected from the group consisting of oil-soluble organic acids and their equivalent derivatives susceptible to overbasing,
   (b) A stoichiometric excess, based on the total equivalents of acid and equivalent derivatives thereof in (a), of basically reacting light magnesium oxide,
   (c) Water, there being at least about one-tenth mole of water up to about five moles of water for each mole of magnesium oxide,
   (d) At least one lower aliphatic alcohol in an amount such that there is at least about 0.1 mole of alcohol for each mole of water,
   (e) At least one substantially inert organic liquid diluent, the diluent being present in an amount such that it comprises from about 10% to about 80% by weight of said mixture,
until reaction between said at least one acidic material and said mixture substantially ceases, subsequently removing substantially all free lower aliphatic alcohol, and continuing the contacting of the said at least one acidic material with said mixture until the liquid phase of said mixture becomes substantially clear and filterable.

2. The process according to claim 1 where the acidic material is an inorganic acidic material.

3. The process according to claim 2 where the acidic material is selected from the class consisting of carbon dioxide, sulfur dioxide, and hydrogen sulfide and (a) is selected from oil-soluble organic acids and metal salts thereof.

4. The process according to claim 3 where said at least one lower aliphatic alcohol is at least one lower alkanol and the alcohol-water molar ratio is in the range of about 0.5:1 to about 10:1.

5. The process according to claim 4 where (a) is at least one member selected from oil-soluble sulfonic and carboxylic acids and their Group I or Group II metal salts.

6. The process according to claim 5 wherein the temperature of said mixture is maintained at about 50°–150° C., said diluent comprises from about 30% to about 70% by weight of said mixture, said lower alkanol is methanol or a combination of methanol and at least one other lower alkanol wherein methanol comprises at least about 25% by weight of said combination, said alcohol-water ratio is about 0.8:1 to about 3:1, said inorganic acidic material is carbon dioxide, and wherein the metal ratio of the basic magnesium salts is in excess of about 5.

7. The process according to claim 5 wherein additional light magnesium oxide and lower alkanol is added to the mixture and the process of contacting the mixture with said acidic material is repeated.

8. The process for preparing oil soluble basic magnesium salts comprising intimately contacting, at a temperature of about 25° C. up to the decomposition temperature, at least one inorganic acidic material with a mixture comprising:
   (a) X equivalents of at least one member selected from oil-soluble organic acids or alkali or alkaline earth metal salts thereof other than an oil-soluble aliphatic carboxylic acids and alkali and alkaline earth metal salts thereof,
   (b) Y equivalents of at least one member selected from oil-soluble aliphatic carboxylic acids and alkali or alkaline earth metal salts thereof,
wherein the ratio of $X:Y$ is about 1:1 to about 20:1,
   (c) Z equivalents of basically reacting magnesium oxide,
wherein the value of $$\frac{Z}{X+Y}$$

is from about 1.1 to about 30,
   (d) At least one lower aliphatic alcohol in an amount such that there is at least about 0.1 mole of alcohol for each mole of water,
   (e) Water, there being at least about one-tenth mole of water up to about five moles of water for each mole of magnesium oxide employed,
   (f) A substantially inert organic liquid diluent, said diluent comprising from about 10% to 80% by weight of said mixture,
until the reaction between said inorganic acidic material and the mixture substantially ceases, subsequently removing substantially all free lower aliphatic alcohol, and continuing the contacting of the said at least one inorganic acidic material with said mixture until the liquid phase of said mixture becomes substantially clear and filterable.

9. The process according to claim 8 wherein the acidic material is selected from the class consisting of carbon dioxide, sulfur dioxide, and hydrogen sulfide and (a) is selected from oil-soluble organic acids and metal salts thereof.

10. The process according to claim 9 comprising carbonating at a temperature of about 50°–150° C. a mixture comprising:
   (a) X equivalents of at least one member selected from oil-soluble organic acids or alkali or alkaline earth metal salts thereof other than an oil-soluble aliphatic carboxylic acids and alkali and alkaline earth metal salts thereof,
   (b) Y equivalents of at least one member selected from oil-soluble aliphatic carboxylic acids and alkali or alkaline earth metal salts thereof,
wherein the ratio of $X:Y$ is about 1:1 to about 10:1,
   (c) Z equivalents of basically reacting magnesium oxide,
wherein the value of $$\frac{Z}{X+Y}$$

is from about 1.1 to about 30,
   (d) At least one lower aliphatic alcohol in an amount such that there is at least about 0.1 mole of alcohol for each mole of water,
   (e) Water, the molar ratio of water to magnesium oxide being from about 0.5:1 to about 3.0:1.0 and
   (f) A substantially inert organic liquid diluent, said diluent comprising from about 30% to about 70% by weight of said mixture,
until the reaction between carbon dioxide and the mixture substantially ceases, subsequently removing substantially all free alcohol, and continuing carbonation until the liquid phase of said mixture becomes substantially clear and filterable.

11. The process according to claim 10 wherein the ratio of $X:Y$ is about 1:1 to about 10:1, (a) is at least one member selected from oil-soluble aromatic carboxylic acids, oil-soluble sulfonic acids, and alkaline earth metal salts thereof and (b) is at least one member selected from oil-soluble aliphatic carboxylic acids and alkaline earth metal salts thereof.

12. The process according to claim 10 wherein the lower aliphatic alcohol is lower alkanol and the molar ratio of alcohol to water is about 0.5:1 to about 10:1.

13. The process according to claim 12 wherein lower alkanol is methanol or a combination of methanol and at least one other lower alkanol where methanol comprises at least 25% by weight of said combination.

14. The process according to claim 10 wherein additional alcohol and magnesium oxide is added to the resulting carbonated reaction mixture to form a second reaction mixture, carbonating the second reaction mixture until the reaction between carbon dioxide and said second reaction mixture substantially ceases, subsequently removing substantially all free alcohol, and continuing carbonation until the liquid phase of said second reaction mixture becomes substantially clear and filterable.

15. The process according to claim 10 wherein (b) comprises at least one member selected from oleic acid, linoleic acid, isostearic acid, tall oil acids and the alkaline earth metal salts of these.

16. The process according to claim 10 wherein the value of $$\frac{Z}{X+Y}$$

is about 2 to about 12; the lower aliphatic alcohol is methanol or a combination of methanol and at least one other lower alkanol wherein methanol constitutes at least 25% by weight of said combination; and the molar ratio of alcohol to water is about 0.8:1 to about 3:1.

17. The process according to claim 10 where said substantially inert organic liquid diluent comprises mineral oil and at least one additional substantially inert organic liquid medium having a boiling point lower than said mineral oil but higher than water.

18. The process comprising contacting at least one inorganic acidic material, selected from the class consisting of carbon dioxide, sulfur dioxide, and hydrogen sulfide, at a temperature of about 25° C. up to the decomposition temperature with a mixture comprising
(a) M equivalents of at least one member selected from oil-soluble hydroxy-substituted aromatic carboxylic acids or equivalent derivatives thereof susceptible to overbasing,
(b) N equivalents of at least one member selected from oil-soluble sulfonic acids and equivalent derivatives thereof susceptible to overbasing,
(c) Q equivalents of basically reacting light magnesium oxide where the ratio of $M:N$ is about 1:1 to about 20:1 and the value of $$\frac{Q}{M+N}$$

is from about 1.1 to about 30,
(d) Water, there being at least about one-tenth mole of water up to about five moles of water for each mole of magnesium oxide, and
(e) A substantially inert organic liquid diluent, the diluent being present in an amount such that it comprises from about 10% to about 80% by weight of said mixture,
until the reaction between the inorganic acidic material and the mixture substantially ceases.

19. The process according to claim 18 comprising carbonating a mixture comprising:
(a) M equivalents of at least one member selected from oil-soluble hydroxy-substituted aromatic carboxylic acids or equivalent derivatives thereof susceptible to overbasing,
(b) N equivalents of at least one member selected from oil-soluble sulfonic acids and equivalent derivatives thereof susceptible to overbasing,
(c) Q equivalents of basically reacting magnesium oxide where the ratio of $M:N$ is about 1:1 to about 20:1 and the value of $$\frac{Q}{M+N}$$

is from about 1.1 to about 30,
(d) Water, the molar ratio of water to magnesium being from about 0.5:1.0 to about 3.0:1.0, and
(e) A substantially inert organic liquid diluent, the diluent being present in an amount such that it comprises from about 30% to about 70% by weight until the reaction between the carbon dioxide and the mixture substantially ceases.

20. A process for preparing oil-soluble basic magnesium salts comprising carbonating at a temperature of about 50°–150° C. a mixture comprising:
(a) M equivalents of at least one member selected from oil-soluble hydroxy-substituted aromatic carboxylic acids and their alkali or alkaline earth metal salts,
(b) N equivalents of at least one member selected from oil-soluble sulfonic acids and their alkali or alkaline earth metal salts,
(c) Q equivalents of basically reacting magnesium oxide where the ratio of $M:N$ is about 1:1 to about 20:1 and the value of $$\frac{Q}{M+N}$$

is from about 2 to about 12,
(d) Water, the molar ratio of water to magnesium being from about 0.5:1.0 to about 3.0:1.0, and at least one lower aliphatic alcohol in an amount such that the molar ratio of alcohol to water in said mixture is in the range of about 0.5:1 to 10:1,
(e) A substantially inert organic liquid diluent, the diluent being present in an amount such that it comprises from about 30% to about 70% by weight of said mixture,
until the reaction between the carbon dioxide and the mixture substantially ceases, subsequently removing substantially all free alcohol, and continuing carbonation until the liquid phase of said mixture becomes substantially clear and filterable.

21. A process according to claim 20 wherein the lower aliphatic alcohol is methanol or a combination of methanol and at least one other lower alkanol wherein methanol constitutes at least 25% by weight of said combination and wherein the molar ratio alcohol to water is about 0.8 to about 3:1.

22. The process according to claim 20 wherein (a) is at least one member selected from oil-soluble aliphatic hydrocarbon-substituted salicylic acids and the alkali or alkaline earth metal salts thereof, wherein each aliphatic hydrocarbon substituent contains an average of at least about sixteen carbon atoms per substituent and there are one to three substituents per molecule of salicyclic acid or alkali or alkaline earth metal salt thereof.

23. The process according to claim 20 wherein additional alcohol and magnesium oxide is added to the resulting carbonated reaction mixture to form a second reaction mixture, carbonating the second reaction mixture until reaction between carbon dioxide and said second reaction mixture substantially ceases, subsequently removing substantially all free alcohol, and continuing carbonation until the liquid phase of said second reaction mixture becomes substantially clear and filterable.

24. An oil-soluble composition produced according to the process of claim 1.

25. An oil-soluble composition produced according to the process of claim 5.

26. An oil-soluble composition produced according to the process of claim 8.

27. An oil-soluble composition produced according to the process of claim 10.

28. An oil-soluble composition produced according to the process of claim 14.

29. An oil-soluble composition produced according to the process of claim 16.

30. An oil-soluble composition produced according to the process of claim 17.

31. An oil-soluble composition produced according to the process of claim 18.

32. An oil-soluble composition produced according to the process of claim 20.

33. An oil-soluble composition produced according to the process of claim 21.

34. An oil-soluble composition produced according to the process of claim 23.

35. A lubricant or fuel comprising, respectively, a major amount of a lubricating oil or a normally liquid petroleum distillate fuel and a detergent amount of a composition according to claim 24.

36. A lubricant or fuel comprising, respectively, a major amount of a lubricating oil or a normally liquid petroleum distillate fuel and a detergent amount of a composition according to claim 25.

37. A lubricant or fuel comprising, respectively, a major amount of a lubricating oil or a normally liquid petroleum distillate fuel and a detergent amount of a composition according to claim 26.

38. A lubricant or fuel comprising, respectively, a major amount of a lubricating oil or a normally liquid petroleum distillate fuel and a detergent amount of a composition according to claim 27.

39. A lubricant or fuel comprising, respectively, a major amount of a lubricating oil or a normally liquid petroleum distillate fuel and a detergent amount of a composition according to claim 28.

40. A lubricant or fuel comprising, respectively, a major amount of a lubricating oil or a normally liquid petroleum distillate fuel and a detergent amount of a composition according to claim 29.

41. A lubricant or fuel comprising, respectively, a major amount of a lubricating oil or a normally liquid petroleum distillate fuel and a detergent amount of a composition according to claim 30.

42. A lubricant or fuel comprising, respectively, a major amount of a lubricating oil or a normally liquid petroleum distillate fuel and a detergent amount of a composition according to claim 31.

43. A lubricant or fuel comprising, respectively, a major amount of a lubricating oil or a normally liquid petroleum distillate fuel and a detergent amount of a composition according to claim 32.

44. A lubricant or fuel comprising, respectively, a major amount of a lubricating oil or a normally liquid petroleum distillate fuel and a detergent amount of a composition according to claim 33.

45. A lubricant or fuel comprising, respectively, a major amount of a lubricating oil or a normally liquid petroleum distillate fuel and a detergent amount of a composition according to claim 34.

46. A lubricant or fuel comprising, respectively, a major amount of a lubricating oil or a normally liquid petroleum distillate fuel and a detergent amount of a composition according to claim 35.

47. A lubricant or fuel comprising, respectively, a major amount of a lubricating oil or a normally liquid petroleum distillate fuel and a detergent amount of a composition according to claim 36.

48. A lubricant comprising a major amount of a mineral lubricating oil and a detergent amount of a composition according to claim 27.

49. A lubricant comprising a major amount of a mineral lubricating oil and a detergent amount of a composition according to claim 29.

50. A lubricant comprising a major amount of a mineral lubricating oil and a detergent amount of a composition according to claim 32.

References Cited

UNITED STATES PATENTS

| | | | |
|---|---|---|---|
| 2,616,904 | 11/1952 | Asseff et al. | 252—33 |
| 3,027,325 | 3/1962 | McMillen et al. | 252—33 |
| 3,057,896 | 10/1962 | Schlicht et al. | 252—33 |

DANIEL E. WYMAN, Primary Examiner

I. VAUGHN, Assistant Examiner

US. Cl. X.R.

44—51, 57, 66, 70, 76; 252—32.5, 32.7 E, 32.7 HC, 33.2, 39